(12) United States Patent
Yang et al.

(10) Patent No.: US 10,598,784 B2
(45) Date of Patent: Mar. 24, 2020

(54) HOME APPLIANCE, NETWORK CONNECTION SYSTEM FOR HOME APPLIANCE AND NETWORK CONNECTION METHOD OF HOME APPLIANCE

(71) Applicant: Samsung Electronics Co., Ltd, Gyeonggi-do (KR)

(72) Inventors: Hee Kyung Yang, Gyeonggi-do (KR); Se Il Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 15/117,438

(22) PCT Filed: Jan. 27, 2015

(86) PCT No.: PCT/KR2015/000847
§ 371 (c)(1),
(2) Date: Aug. 8, 2016

(87) PCT Pub. No.: WO2015/119394
PCT Pub. Date: Aug. 13, 2015

(65) Prior Publication Data
US 2016/0373270 A1    Dec. 22, 2016

(30) Foreign Application Priority Data

Feb. 6, 2014 (KR) .................. 10-2014-0013455

(51) Int. Cl.
*G06F 21/00* (2013.01)
*H04L 29/06* (2006.01)
(Continued)

(52) U.S. Cl.
CPC .............. *G01S 17/36* (2013.01); *G01S 7/499* (2013.01); *G01S 7/4915* (2013.01); *G01S 17/936* (2013.01)

(58) Field of Classification Search
CPC ..... H04L 12/2807; H04L 63/08; H04L 63/10; H04L 12/12; H04L 2012/285;
(Continued)

(56) References Cited

U.S. PATENT DOCUMENTS

| 7,991,161 B2 | 8/2011 | Chen |
| 2005/0149758 A1 | 7/2005 | Park |

(Continued)

FOREIGN PATENT DOCUMENTS

| CN | 1361618 A | 7/2002 |
| CN | 2891500 Y | 4/2007 |

(Continued)

OTHER PUBLICATIONS

International Search Report dated Apr. 28, 2015 in connection with International Application No. PCT/KR2015/000847, 5 pages.

(Continued)

*Primary Examiner* — Lisa C Lewis

(57) ABSTRACT

Disclosed herein is a method of connection of home appliance to a network, a network-connection system for home appliances, and an apparatus related to a network-connection setting for home appliances. The network connection method of home appliance includes an operation in which a terminal device receives an input of an authentication key of an access point (AP) apparatus and the terminal device or the AP apparatus verifies and authenticates the authentication key; an operation in which a home appliance is set to be in a state of communicating with the terminal device; an operation in which the home appliance is interconnected to the terminal device and the terminal device transmits an identification number and the certificated authentication key of the AP apparatus to the home appliance; and an operation in which the home appliance is connected to the AP appa- (Continued)

ratus based on the identification number and the authentication key of the AP apparatus.

20 Claims, 19 Drawing Sheets

(51) Int. Cl.
*G01S 17/36* (2006.01)
*G01S 7/4915* (2020.01)
*G01S 17/93* (2020.01)
*G01S 7/499* (2006.01)

(58) Field of Classification Search
CPC ..... H04W 76/14; H04W 12/08; H04W 60/00; H04W 12/06; H04W 84/18
See application file for complete search history.

(56) References Cited

U.S. PATENT DOCUMENTS

| | | | |
|---|---|---|---|
| 2006/0146837 A1* | 7/2006 | Atsuki | H04L 12/2818 370/400 |
| 2006/0251256 A1 | 11/2006 | Asokan et al. | |
| 2007/0266246 A1 | 11/2007 | Lee et al. | |
| 2010/0205655 A1 | 8/2010 | Mokuya | |
| 2013/0173811 A1 | 7/2013 | Ha et al. | |

FOREIGN PATENT DOCUMENTS

| | | |
|---|---|---|
| CN | 202334585 U | 7/2012 |
| CN | 103188824 A | 7/2013 |
| EP | 1309127 A1 † | 5/2003 |
| EP | 2498469 A1 | 9/2012 |
| EP | 2611079 A1 † | 7/2013 |
| JP | 2004-355396 | 12/2004 |
| JP | 2004-355396 A | 12/2004 |
| JP | 2008-4975 A | 1/2008 |
| JP | 2008004975 A | 1/2008 |
| JP | 2011-4424 A | 1/2011 |
| JP | 2011004424 A | 1/2011 |
| JP | 2013-085050 | 5/2013 |
| KR | 10-2013-0080487 | 7/2013 |
| WO | 2012060021 A1 | 5/2012 |
| WO | 2013/015656 A2 | 1/2013 |
| WO | 2013015656 A2 † | 1/2013 |

OTHER PUBLICATIONS

Written Opinion of the International Searching Authority dated Apr. 28, 2015 in connection with International Application No. PCT/KR2015/000847, 9 pages.
Kim, Geon-Woo, et al., "Proposal for revised draft Recommendation X.homesec-4: Authorization framework for home network," International Telecommunication Union, Telecommunication Standardization Sector, Study Period 2005-2008, COM17-C397-E, Sep. 2008, 30 pages.
European Patent Office, "Supplementary European Search Report," Application No. EP15746422, dated Jun. 7, 2017, 10 pages.
European Patent Office, "Communication pursuant to Article 94(3) EPC," Application No. EP15746422.3, dated Oct. 29, 2018, 6 pages.
Communication pursuant to Article 94(3) EPC dated Feb. 9, 2018 in connection with European Patent Application No. 15 746 422.3.
Office Action dated Aug. 12, 2019 in connection with Chinese Patent Application No. 201580018500.0, 8 pages.
Office Action dated Aug. 29, 2019 in connection with Japanese Patent Application No. 2016-550649, 7 pages.
China National Intellectual Property Administration, "The Second Office Action," Application No. CN201580018500.0, dated Apr. 29, 2019, 22 pages.
China Intellectual Property Administration, "The First Office Action," Application No. CN201580018500.0, dated Nov. 26, 2018, 28 pages.
Japan Patent Office, "Office Action," Application No. JP2016-550649, dated Feb. 5, 2019, 9 pages.

\* cited by examiner
† cited by third party

FIG. 5

| 1 | AP DEVICE CURRENTLY CONNECTED |
|---|---|
| 2 | AP DEVICE MOST RECENTLY CONNECTED |
| 3 | AP DEVICE HAVING THE HIGHEST SIGNAL STRENGTH |
| 4 | AP DEVICE SELECTED BY A USER |

HOME APPLIANCE, NETWORK CONNECTION SYSTEM FOR HOME APPLIANCE AND NETWORK CONNECTION METHOD OF HOME APPLIANCE

CROSS-REFERENCE TO RELATED APPLICATIONS AND CLAIM OF PRIORITY

The present application claims priority under 35 U.S.C. § 365 to International Patent Application No. PCT/KR2015/000847 filed Jan. 27, 2015, entitled "HOME APPLIANCE, NETWORK CONNECTION SYSTEM FOR HOME APPLIANCE AND NETWORK CONNECTION METHOD OF HOME APPLIANCE", and, through International Patent Application No. PCT/KR2015/000847, to Korean Patent Application No. 10-2014-0013455 filed Feb. 6, 2014, each of which are incorporated herein by reference into the present disclosure as if fully set forth herein.

TECHNICAL FIELD

Embodiments of the present disclosure relate to a method of connection of home appliance to a network, a network-connection system for home appliances, and an apparatus related to a network-connection setting for home appliances.

BACKGROUND ART

In general, a home appliance represents an electrical appliance used in the household. Home appliances may include a refrigerator, a washing machine, a television, a radio, an audio, a cleaner, an air conditioner, an oven, a Smart TV, a digital camera, a home computer or a laptop, and various types of electronic appliances used in the house hold.

In recent, a home appliance may include various processors, such as micro control unit (MCU). The MCU represents a control device, which includes a central processing unit (CPU), storage such as random access memory (RAM) or read only memory (ROM) and various modules, such as various ports implemented as a single chip. Home appliances may provide a variety of information necessary for a user and may perform an operation corresponding to the instruction received from a user by using the processor. Therefore, home appliances may refer to as smart device or smart appliance. The smart device or smart appliance represents a device or an appliance in which functions of thereof are not limited, and thus substantial portion of function is changeable and expandable through various application programs.

DISCLOSURE

Technical Problem

Therefore, it is an aspect of the present disclosure to provide a network connection system for home appliance and a method of connection of home appliance to a network configured to allow a user to easily set a network connection of home appliance without an error.

Technical Solution

In accordance with one aspect of the present disclosure, a network connection method of home appliance includes an operation in which a terminal device receives an input of an authentication key of an access point (AP) apparatus and the terminal device or the AP apparatus verifies and authenticates the authentication key; an operation in which a home appliance is set to be in a state of communicating with the terminal device; an operation in which the home appliance is interconnected to the terminal device and the terminal device transmits an identification number and the certificated authentication key of the AP apparatus to the home appliance; and an operation in which the home appliance is connected to the AP apparatus based on the identification number and the authentication key of the AP apparatus.

The network connection method of home appliance may further include an operation in which the terminal device displays an operation method of setting the home appliance to be in a state of communicating with the terminal device The network connection method of home appliance may further include an operation in which the terminal device searches a home appliance, which is set to be in a state of communicating with the terminal device.

The home appliance and the terminal device may be communicated with each other by using Wi-Fi direct.

The network connection method may further include an operation in which the AP apparatus is connected to the terminal device.

The network connection method may further include an operation in which the home appliance is connected to the AP apparatus and then the home appliance accesses to a server device via the AP apparatus.

The network connection method may further include an operation in which, when the home appliance accesses to the server device, the server device registers the home appliance to a user account related to the terminal device.

The network connection method may further include an operation in which the terminal device verifies the authentication key by determining whether the authentication key is identical to an authentication key of the AP apparatus stored in the terminal device.

The terminal device may repeatedly receive an input of the authentication key to verify the authentication key until the authentication key is authenticated.

The network connection method may further include an operation in which the terminal device or the home appliance transmits the user authentication information to a server device, and in this case the server device may perform a user authentication based on the user authentication information.

The terminal device may include at least one of a desktop computer, a laptop computer, a smart phone, a cellular phone, a tablet PC, a Smart TV, a digital cameras, a personal digital assistant (PDA), a remote controller, and a portable gaming device.

The home appliance may include at least one of a refrigerator, a washing machine, a television, a radio, an audio, a cleaner, an air conditioner, a home computer, an oven, a Smart TV, a digital camera, or a laptop.

In accordance with one aspect of the present disclosure, a home appliance includes a communication unit connected to a network and configured to receive access point (AP) apparatus access information, and a processor configured to try a connection to an AP apparatus by using the AP apparatus access information, and configured to control to connect to a server device via the AP apparatus by using stored Internet Protocol (IP) address when connected to the AP apparatus The processor may perform a user authentication procedure by using user authentication information received from the communication unit when accessing to the server device.

The communication unit may receive the access point (AP) apparatus access information from the terminal device, wherein the access point (AP) apparatus access information may include at least one of an identification number of an AP apparatus and an authentication key of the AP apparatus.

The communication unit may further receive server device access information to access to the server device.

The home appliance may further include a setting unit configured to set the home appliance to be in a state of communicating with a terminal device.

In accordance with one aspect of the present disclosure, a network connection system of home appliance includes an access point (AP) apparatus connected to an external network, a terminal device configured to receive an input of an authentication key of the AP apparatus, and at least one home appliance interconnected to the first terminal device by being set to be in a state of communicating with the terminal device, configured to receive an identification number and the authentication number of the AP apparatus, and connected to the AP apparatus based on the identification number and the authentication number, wherein the terminal device or the AP apparatus may authenticate the authentication key by verifying the authentication number.

The terminal device may display an operation method of setting the home appliance to be in a state of communicating with the terminal device.

The terminal device may search a home appliance, which is set to be in a state of communicating with the terminal device The home appliance and the terminal device may be communicated with each other by using Wi-Fi direct.

The AP apparatus may be connected to the terminal device.

The network connection system of home appliance may further include a server device to which the home appliance is accessed via the AP apparatus after connected to the AP apparatus.

The server device may register the home appliance to a user account related to the terminal device when the home appliance accesses to the server device.

The terminal device or the home appliance may transmit user authentication information to the server device, and the server device may perform a user authentication based on the user authentication information.

The terminal device may verify the authentication key by determining whether the authentication key is identical to an authentication key of the AP apparatus stored in the terminal device.

The terminal device may repeatedly receive an input of the authentication key to verify the authentication key until the authentication key is authenticated.

The terminal device may include at least one of a desktop computer, a laptop computer, a smart phone, a cellular phone, a tablet PC, a Smart TV, a digital cameras, a personal digital assistant (PDA), a remote controller, and a portable gaming device.

The home appliance may include at least one of a refrigerator, a washing machine, a television, a radio, an audio, a cleaner, an air conditioner, a home computer, an oven, a Smart TV, a digital camera, or a laptop.

Advantageous Effects

As is apparent from the above description, according to the proposed network connection system of home appliance and a network connection method of home appliance, a user may easily set a network connection of home appliance so that user convenience may be improved.

According to the system and method, an error, which may be generated in a process of accessing to an access point (AP) apparatus of home appliance, may be prevented so that home appliance may be reliably accessed to the AP apparatus.

According to the system and method, it may be verified and prevented that a home appliance is connected to the AP apparatus by a malicious user, and thus safety of using home appliance may be improved.

A user may more easily set a network connection of home appliance, in which a network connection is set by other user

DESCRIPTION OF DRAWINGS

These and/or other aspects of the invention will become apparent and more readily appreciated from the following description of the embodiments, taken in conjunction with the accompanying drawings of which:

FIG. 5 is a view illustrating selecting ranking of a wireless access point (AP) apparatus;

BEST MODE

Figure 1:
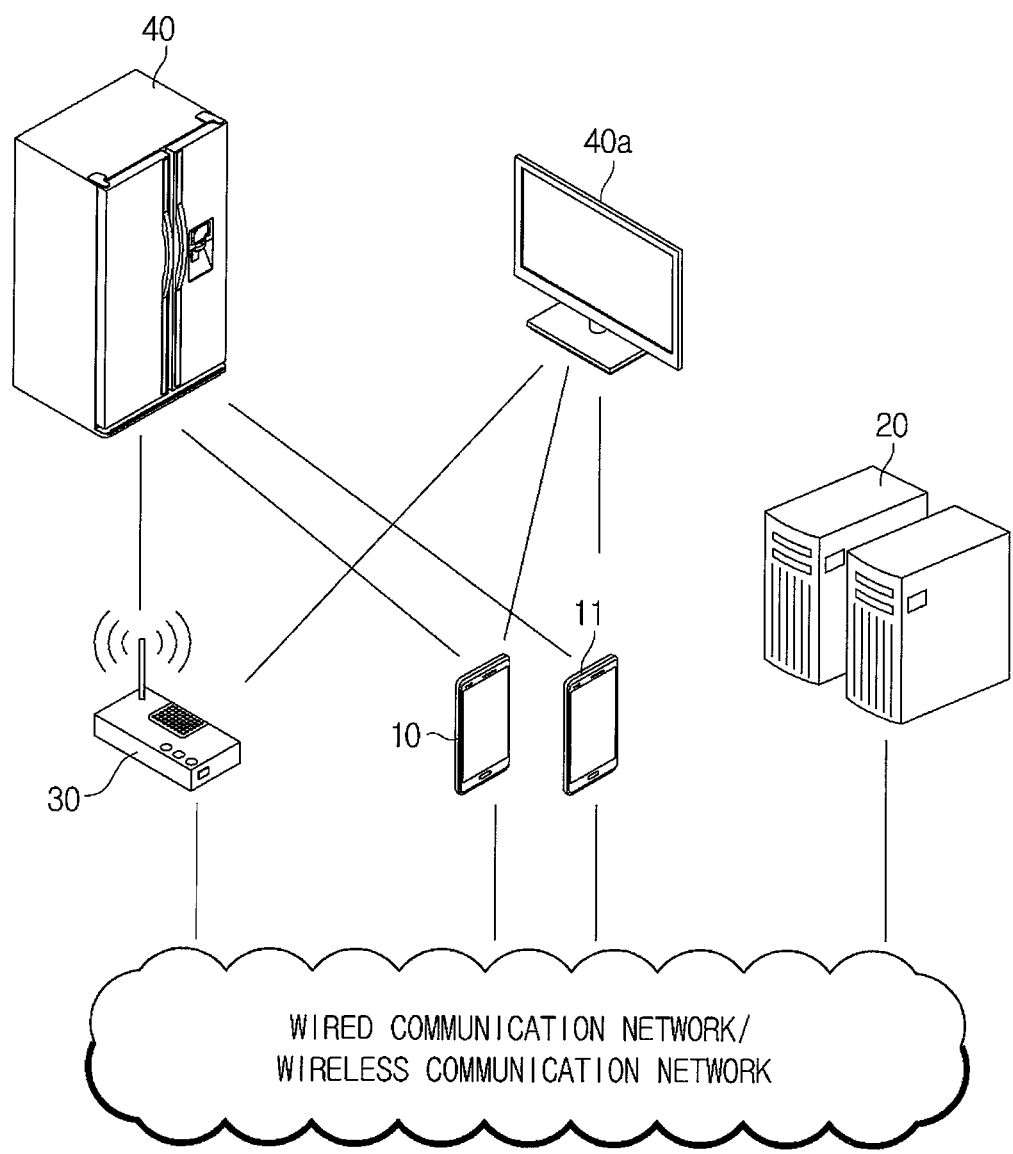
FIG. 1 is a diagram of a network connection system of home appliance in accordance with one embodiment of the present disclosure.

Hereinafter a network connection system of home appliance will be described with reference to FIG. 1. FIG. 1 is a diagram of a network connection system of home appliance in accordance with one embodiment of the present disclosure. As illustrated in FIG. 1, a network connection system of home appliance may include at least one first terminal 10, a server device 20, an access point (AP) apparatus 30, and at least one home appliance 40 and 40a. The first terminal 10, the server device 20 and the AP apparatus 30 may transmit/receive data through a wired/wireless communication network. For example, the sever device 20 and the AP apparatus 30 may transmit/receive data to each other through a wired communication network. The first terminal 10 and the AP 30 may transmit/receive data to each other through a wireless communication network. The at least one home appliance 40 and 40a, and the first terminal device 10 or the AP 30 may transmit/receive data to each other through a wireless communication network.

A wired communication network represents a communication network capable of transmitting/receiving an electrical signal by using a communication medium, such as a wire. Various devices, such as loaded cable, coaxial cable or fiber optic cable, may be used as a communication medium of the wired communication network. A wireless communication network represents a communication network capable of transmitting/receiving an electrical signal without a medium, such as a wire.

A wireless communication network may be a network built by various wireless communication systems. The wireless communication network may include both of a local area communication network and a telecommunication network. The wireless communication network may transmit data by using various communication systems, such as Bluetooth™, Zigbee™, WirelessHART, near field communication (NFC), Wi-Fi, Wi-Fi Direct, GSM/3GPP-based communication system i.e., GSM, HSDPA, LTE Advanced, 3GPP2-based communication system, i.e., CDMA, or WiMAX-based communication system, i.e., WiBro.

The first terminal device 10 may receive an input of an authentication key from a user. The authentication key inputted into the first terminal device 10 may be serial numbers constituting at least one of characters, numbers, and various symbols. The serial number may be a password. In addition, the authentication key may be electronic information, such as a public certificate. As needed, the first terminal device 10 may verify and authenticate inputted authentication key. For example, the first terminal device 10 may authenticate that the inputted authentication key is correct by determining whether the inputted authentication key is identical to previously inputted authentication key, or whether the inputted authentication key is identical to a predetermined value. As needed, the first terminal device 10 may repeatedly receive an authentication key from a user until authenticating an authentication key is completed.

The first terminal device 10 may include at least one of a desktop computer, a laptop computer, a smart phone, a cellular phone, a tablet PC, a Smart TV, a digital camera, a personal digital assistant (PDA), a remote controller, and a portable gaming device. Other than the above, the first terminal device 10 may include various devices capable of transmitting/receiving data to/from other device in the outside by using a certain wired/wireless communication network. In the first terminal device 10, a communication module may be installed for the communication. As for a wireless communication, the communication module may include an antenna, and a wireless communication chip. As for a wired communication, the communication module may include a wired communication cable, and a LAN card to which a wired communication cable is mounted. In addition, the first terminal device 10 may further include a processor to process data, which is transmitted/received through a communication module. The processor may be a processing device in which an arithmetic logic operator, a register, a program counter, an instruction decoder and a control circuit are installed on a single silicon chip. A certain processor may be realized by at least one semiconductor chip disposed on a certain printed circuit board embedded in a housing of the first terminal device 10. The first terminal device 10 may be provided with a display unit to display an image. The display unit may be realized by a display device manufactured by using liquid crystal display (LCD), light emitting diode (LED) or organic light emitting diode (OLED). According to the control of the processor, the display unit may display a method of setting connection between the home appliance 40 and 40a and the AP apparatus 30 by using characters, images, or videos and the like.

In accordance with one embodiment of the present disclosure, the network connection system of home appliance may further include a second terminal device 11. The second terminal device 11 may be the same type of the first terminal device 10 or may be the different type of the first terminal device 10. For example, the first terminal device 10 may be a smart phone and the second terminal device 11 may be a tablet PC. A user of the first terminal device 10 and a user of the second terminal device 11 may be the same or may be different.

The server device 20 may receive data from at least one of the first terminal device 10 and the second terminal device 11, may perform operation, determination, and process based on the received data, and may transmit a result of performing, such as operation, determination, and process, to at least one of the first terminal device 10 and the second terminal device 11. The server device 20 may be realized by at least one computing device. In other words, the server device 20 may be realized by a plurality of computing devices. Each of the plurality of computing devices may perform the same functions or different functions from each other.

The AP apparatus 30 represents an apparatus configured to allow various wireless devices to be connected to a wired device. The AP apparatus 30 may be provided with a slot connected to a wired communication cable, and may transmit/receive data to/from the server device 20 via the wired communication cable. The AP apparatus 30 may include a router connected to the wired communication network. In addition, the AP apparatus 30 may be connected to at least one the first terminal device 10 and the second terminal device 11, or the home appliance 40 and 40a via a wireless communication network. The AP apparatus 30 may include a wireless communication module for a wireless communication network. The wireless communication module of the AP apparatus 30 may include an antenna and a wireless communication chip. The AP apparatus 30 may perform a communication by using various communication standards, such as IEEE 802.11 standard. Particularly, the AP apparatus 30 may perform communication by using various communication technologies, such as WiFi, near field communication (NFC), or Bluetooth™. In order to secure the wireless communication, the AP apparatus 30 may encrypt a packet by using a variety of encryption methods, and may transmit the encrypted packets to the outside.

The AP apparatus 30 may receive an authentication key from an external terminal device, and when the inputted authentication key is correct the AP apparatus 30 may allow the external terminal device to be connected the AP apparatus 30. For example, the AP apparatus 30 may receive an authentication key from the home appliance 40 and 40a, may determine whether the received authentication key is identical to pre-stored authentication key, and may allow the home appliance 40 and 40a to be connected to the AP apparatus 30 when the received authentication key is identical to pre-stored authentication key. When the AP apparatus 30 allows the connection, the home appliance 40 and 40a may be connected to the AP apparatus 30, and may be connected to an external network through the AP apparatus 30.

The authentication key may be serial numbers constituting at least one of characters, numbers, and various symbols. The serial number may be a password. In addition, an authentication key may be electronic information, such as a public certificate.

The home appliance 40 and 40a may include a communication module and a processor. The communication module is configured to communicate with at least one of the first terminal device 10, the second terminal device 11, and the AP apparatus 30, and the processor is configured to control the overall operation of the home appliance 40 and 40a. The communication module may be a wired communication module or a wireless communication module. As for a wired communication, the communication module may include a wired communication cable, and a LAN card in which a wired communication cable is mounted. As for a wireless communication, the communication module may include an antenna, and a wireless communication chip. The communication module may communicate with at least one of the first terminal device 10, the second terminal device 11, and the AP apparatus 30 by using various communication technologies, such as WiFi, near field communication (NFC), or Bluetooth™. For example, the home appliance 40 and 40a may perform a data communication with the first terminal 10 or the second terminal 11 by using WiFi direct. The processor may be realized by various processing devices, such as micro control unit (MCU). The processor may a control communication module, and may process data received through the communication module. The processor may generate a control command configured to try to access to the AP apparatus 30 by using an identification number and an authentication key of the AP apparatus 30 received from the first terminal device 10 via the communication module.

As needed, the home appliance 40 and 40a may further include a display unit to display a variety of information and an input unit to receive various instructions from a user. The display unit may be a display device realized by liquid crystal display (LCD), light emitting diode (LED) or organic light emitting diode (OLED). The input unit may be directly installed in the home appliance 40 and 40a, or may be installed on an external device connected to the home appliance. The external device connected to the home appliance may include a remote control device. In accordance with one embodiment, the input unit may receive an instruction of entering the home appliance to an access point connection mode so that at least one home appliance may be connected to an AP apparatus. In accordance with embodiments, the home appliance 40 and 40a may include a touch screen unit. The touch screen unit may receive an input of an instruction from a user according to a touch operation of a user while displaying an image. Therefore, the touch screen unit may provide a function of display unit and a function of input unit at the same time.

The home appliance 40 and 40a may include a refrigerator, a washing machine, a television, a radio, an audio, a cleaner, an air conditioner, an oven, a digital camera, a Smart TV, and a home computer or various types of electronic appliances other than a laptop.

Hereinafter a method of setting a network connection of home appliance by using the first terminal device will be described with reference to FIGS. 2 to 12.

Figure 2:
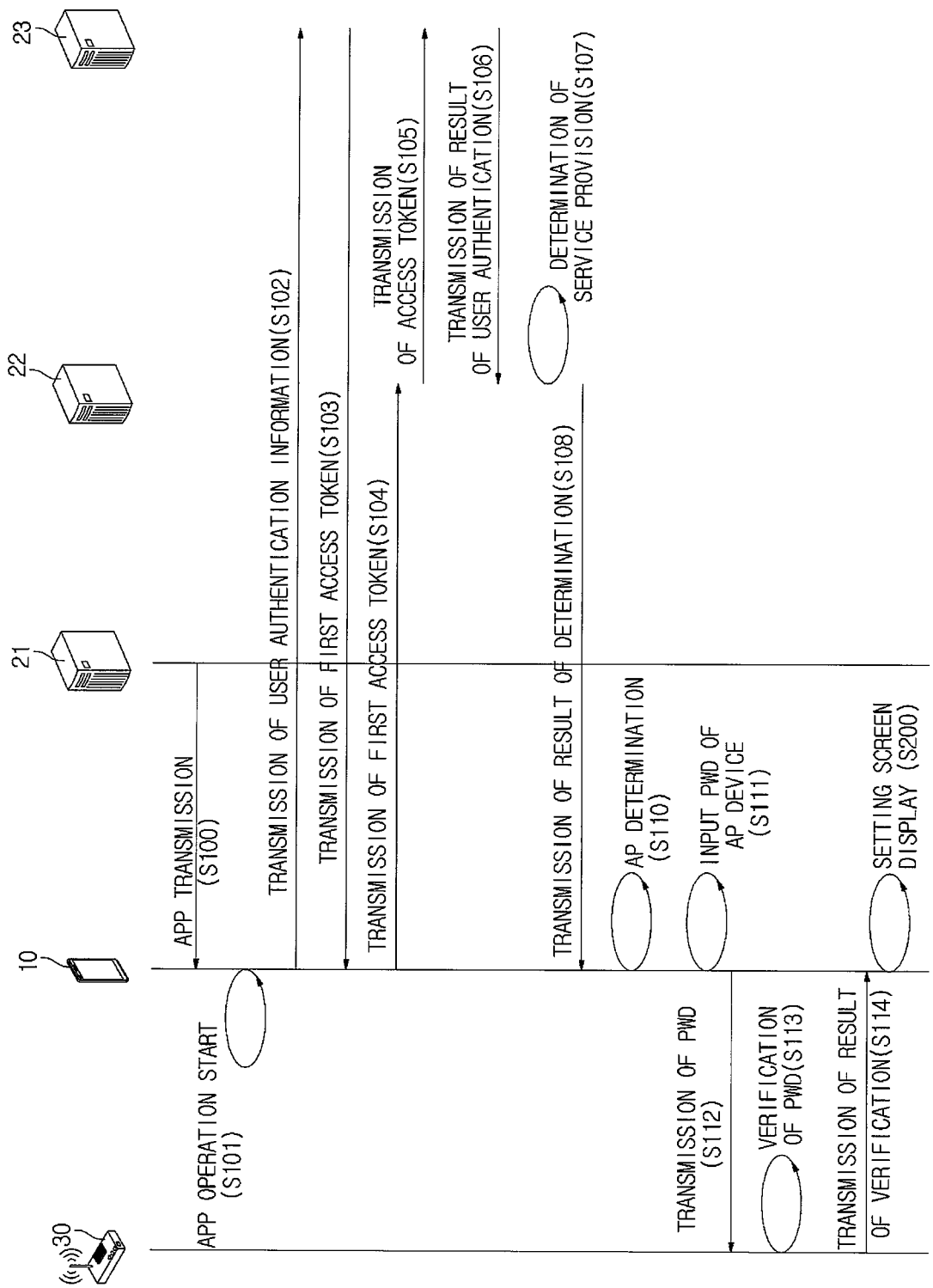
FIG. 2 is a flow chart illustrating an exemplary process of displaying a method of setting home appliance on an external terminal device appliance.
Figure 3:
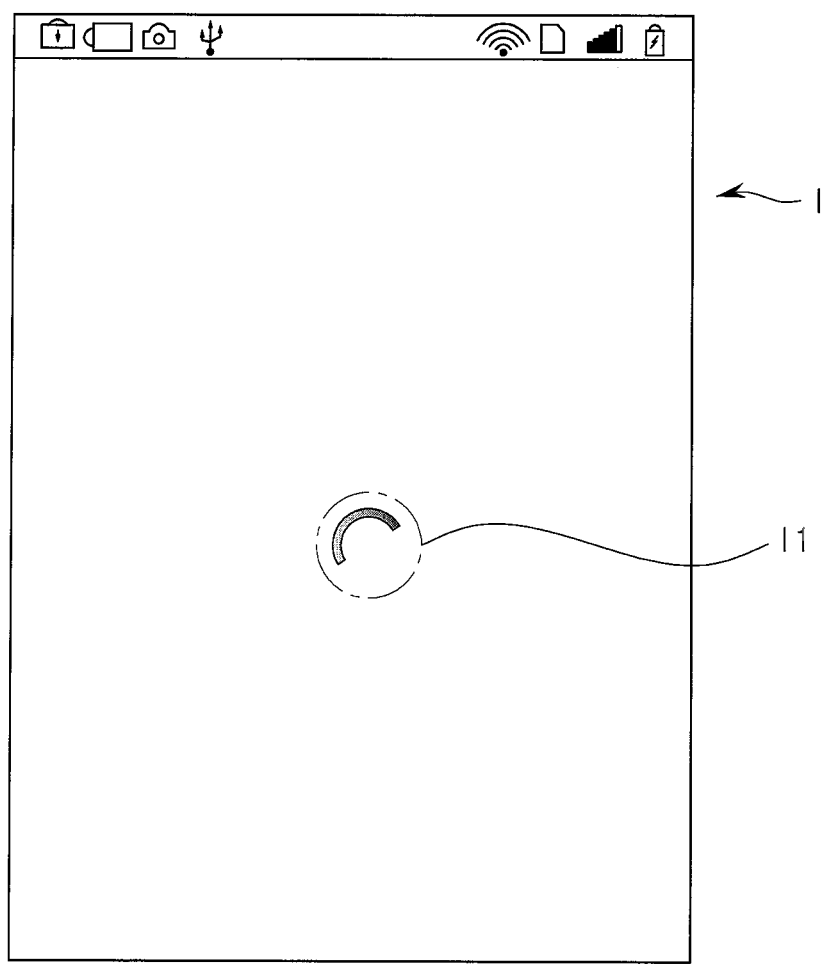
FIGS. 3 and 4 are views illustrating an exemplary screen displayed on an external terminal device while setting home appliance.
Figure 4:
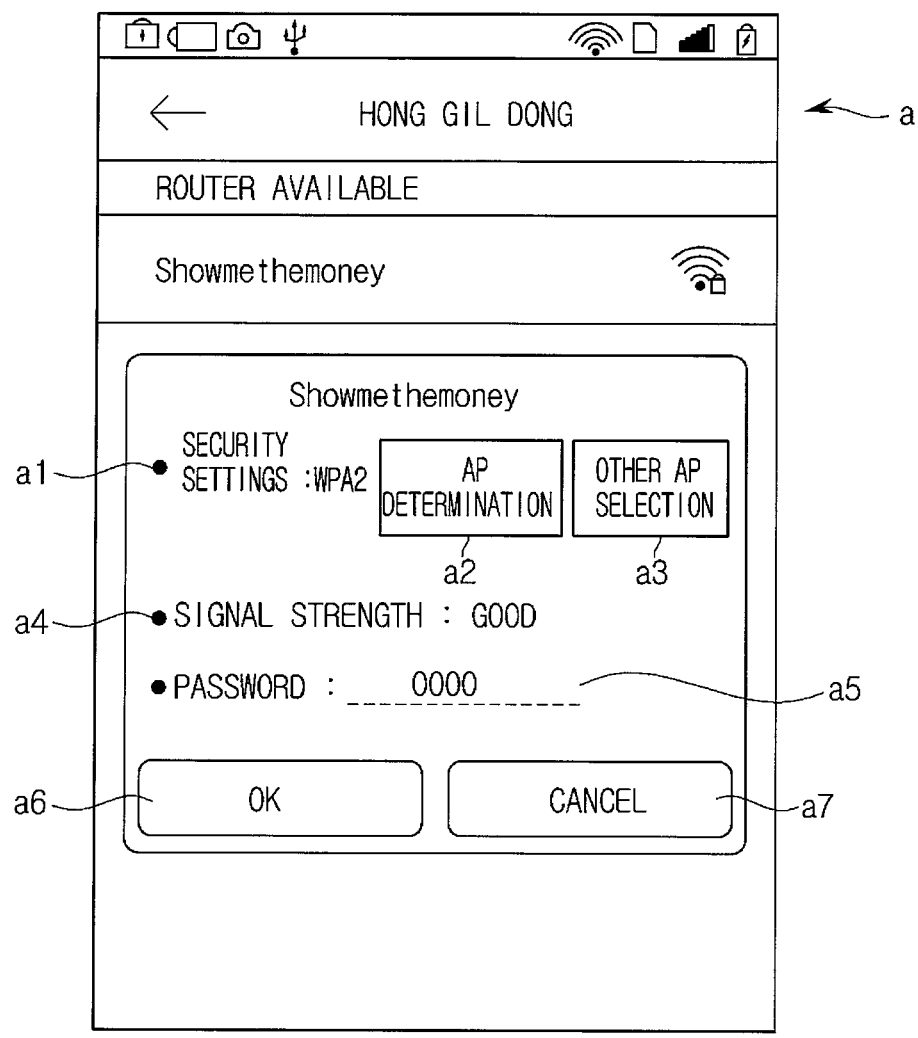

FIG. 2 is a flow chart illustrating an exemplary process of displaying a method of setting home appliance on an external terminal device appliance and FIGS. 3 and 4 are views illustrating an exemplary screen displayed on an external terminal device while setting home appliance. FIG. 2 illustrates an example of the server 20 including three of server device 21 to 23. This is for convenience of description, but the sever device 20 may be one, two or more than four. This may be determined according to the random choice of a system designer. A first server device 21 of FIG. 2 may be an application storage server in which at least one application (referred to as APP on the drawings) is stored. The application may be programmed to implement a network connection method. The first server 21 may store an application or updated file of application, may transmit the application or the updated file of application to the first terminal device 10 and the second terminal device 11 according to a request of the first terminal device 10. The second sever device 22 may be an authority process server for processing a user's network setting authority. A third server device 23 may be a server device managed by a service provider providing a home network service, such as a remote control of home appliance, and may manage an account of a user subscribed to the service. The user account may include user information and a list of home appliance, which is registered by a user. Even when a user is not in the house, the user may remotely control the home appliances registered in the user account by connecting to the third server device 23 via a wired/wireless communication network of out of the house.

Referring to FIG. 2, the first terminal device 10 may receive an application from the first server device 21 (s 100) so that the home appliance 40 may be connected to the AP 30 to be connected to a network. When the application is already installed in the first terminal device 10, s 100 may be omitted. When the application installed in the first terminal device 10 is needed to be updated, an application update file may be transmitted from the first server device 21 to the first terminal device 10. The first terminal device 10 may install the application received from the first server device 21 or may install the application update file received from the first server device 21, and then may execute the installed application (s 101).

When the application is executed, the first terminal device 10 may be connected to the third server device 23 via a network. The first terminal device 10 may transmit user authentication information to the third server device 23 to access to the third server device 23 by using a pre-registered user account (s 102). If a user account registered in the third server device 23 is absent, the third server device 23 may perform registration process to register a user account. Hereinafter for convenience of description, it is assumed that a pre-registered user account is already existed. User authentication information may include at least one of user identification number (ID) and password for authentication. The ID and password for authentication may be formed by at least one of symbol, character and number. The ID may include a variety type of indicators capable of identifying a person, such as a user's e-mail address, register number and mobile phone number. As needed, the first terminal device 10 may display an input window to receive user identification number and a password for authentication for user authentication. The first terminal device 10 may store user identification number and a password for authentication in advance. The user authentication information may be encrypted for security before transmitted to the third server device 23.

The third server device 23 may receive authentication information, and may perform user authentication based on the received authentication information. In this case, the third server device 23 may analyze encrypted authentication information and may perform user authentication based on the analyzed authentication information. If user authentication succeeds, the third server device 23 may access to the registered user account and may transmit a first access token related to a network setting authority of the home appliance 40. If user authentication is failed, the third server device 23 may transmit information related to failure of user authentication to the first terminal device 10. The first terminal device 10 may output user authentication failure message on a screen, i.e., a display unit based on the information related to failure of user authentication. As needed, the first terminal device 10 may output user authentication failure message in a sound.

When the first terminal device 10 receives the first access token, the first terminal device 10 may request an authority of access to the home appliance 40 by transmitting the first access token to the second server device 22 (s 104). For the integrity of the first access token, the second server device 22 may transmit the received the first access token to the third server device 23 (s 105), and the third sever device 23 may transmit information for the integrity of the first access token, such as a result of user authentication, to the second server device 22. When the integrity of the first access token is proved, the second server device 22 may determine to provide network connection setting service of home appliance (s 107), and may transmit a result of determination to the first terminal device 10 (s 108).

The first terminal device 10 may display a certain screen I, as illustrated in FIG. 3, while performing the above-mentioned process. An image and a video, which is to indicate that a variety of processes related to an authentication are performed, may be displayed on a portion of the screen I. In accordance with one embodiment, the first terminal device 10 may inform that the authentication process is performed to a user by outputting a sound.

When receiving a result of determination from the second server device 22, the first terminal device 10 may determine the AP apparatus 30 to which the home appliance is connected. In this case, the first terminal device 10 may display an input window a, as illustrated in FIG. 4, to receive the determination of the AP apparatus 30 and an authentication key of the AP apparatus 30. In the input window a, a variety of information to display the AP apparatus 30, such as security setting a1 and signal intensity a4, may be displayed. In addition, a button a3 to select other AP apparatus, an authentication key input portion a5 to receive an authentication key of AP apparatus, a OK button a6 and a cancel button a7, both of which are to receive an instruction for performing function of following step, such as transmitting an authentication key, may be displayed in the input window a.

If a plurality of AP apparatuses 30 is present, the first terminal device 10 may determine at least one AP apparatus 30 among the plurality of AP apparatuses 30 based on AP connection ranking. The AP apparatus connection ranking may be determined based on a variety of standards. For example, the AP apparatus connection ranking may be generated based on at least one of a connection time between the AP apparatus 30 and the first terminal device 10, a connection time between the AP apparatus 30 and at least one of the home appliance 40 and 40a, access time, which is a time point when the first terminal device 10 or at least one of the home appliance 40 and 40a is connected to the AP apparatus 30, radio wave strength of the AP apparatus 30, and a result of selecting AP apparatus by a user.

FIG. 5 is a view illustrating selecting ranking of access point (AP) apparatus. For example, as illustrated in FIG. 5, the AP apparatus 30 may be selected in the following order: a AP apparatus to which the first terminal device 10 or at least one home appliance 40 and 40a is currently connected, a AP apparatus to which the first terminal device 10 or at least one home appliance 40 and 40a is most recently connected, a AP apparatus having the highest signal strength, and a AP apparatus selected by a user. In other words, the first terminal device 10 may confirm that the AP apparatus 30 currently connected thereto is present, and may select the AP apparatus 30 currently connected thereto. When the AP apparatus 30 currently connected to the first terminal device 10 is absent, the first terminal device 10 may confirm that the AP apparatus 30 most recently connected thereto is present by reading access records, and when the AP apparatus 30 most recently connected thereto is present, the first terminal device 10 may access to the AP apparatus 30 most recently connected to the first terminal device 10. When the AP apparatus 30 most recently connected to the first terminal device 10 is absent, the first terminal device 10 may select an AP apparatus having the highest signal strength among a plurality of AP apparatuses 30. When the AP apparatus 30 is not determined by using the above-mentioned method, the first terminal device 10 may receive an input of a command related to selection of the AP apparatus 30 from a user by displaying a message of request of selecting the AP apparatus 30. As needed, a user may arbitrarily select the AP apparatus 30 regardless of selection ranking of the AP apparatus.

The purpose of selecting the AP apparatus 30 through the first terminal device 10 is that the home appliance 40 and 40a is connected to communicate with the AP apparatus 30 so that corresponding home appliance 40 and 40a access to the third server device 23 via the AP apparatus 30, and the third server device 23 registers the corresponding home appliance 40 and 40a to the list of the user account. In other words, the terminal device 10 may generate authentication information to be connected to the AP apparatus 30, and may transmit the authentication information to the home appliance 40 and 40a, and then the home appliance 40 and 40a may be connected to the AP apparatus 30 by using the received authentication information. Therefore, user' inconvenience, which is a user connects the home appliance 40 and 40a to the AP apparatus 30 by directly operating the home appliance 40 and 40a, may be relieved.

When the AP apparatus 30 is determined, the user may input an authentication key to the AP apparatus 30 into the authentication key input portion a5 of the first terminal device 10 (s 111), and the first terminal device 10 may transmit the inputted authentication key to the AP apparatus 30 (s 112). The AP apparatus may identify whether the authentication key is identical to an authentication key stored in the AP apparatus 30 by verifying the received authentication key (s 113). The AP apparatus 30 may identify the authentication key and then may transmit a result of identification to the first terminal device 10 (s 114). When the received authentication key is identical to an authentication key of the AP apparatus 30, the AP apparatus 30 may transmit information, which is the received authentication key is identical to an authentication key of the AP apparatus 30, to the first terminal device 10. When the received authentication key is different from an authentication key of the AP apparatus 30, the AP apparatus 30 may transmit information, which is the received authentication key is different from an authentication key of the AP apparatus 30, to the first terminal device 10.

In a state where the terminal device 10 is connected to the AP apparatus 30, or the terminal device 10 was connected to the AP apparatus 30 in previous, information related to an authentication key of the corresponding AP apparatus 30 may be stored in a memory unit installed in the first terminal device 10 and thus the first terminal device 10 may perform a process of determining whether an authentication key inputted by a user is correct by itself.

When the selected AP apparatus 30 and an authentication key, which is to be connected to the AP apparatus 30, are inputted into the first terminal device 10, the first terminal device 10 may generate network setting information and store the network setting information in the memory unit. The stored network setting information may be transmitted to the home appliance 40 and 40a so that the corresponding home appliance 40 and 40a may be allowed to be connected to the AP apparatus 30. In addition, the network setting information may include information about a user account registered on the third server device 23. Therefore, the home appliance 40 and 40a access to the third sever device 23 via the AP apparatus 30, and an authentication process may be performed by using registered user account of the network setting information so that the corresponding home appliance 40 and 40a may be registered on the user account.

A process of determining whether an authentication key to the AP apparatus 30 inputted by a user is correct, is important. In a state where network setting information is generated by using an incorrect authentication key and then transmitted to the home appliance 40 and 40a, when the home appliance 40 and 40a tries to connect to the AP apparatus 30 by using the network setting information, the connection to the AP apparatus 30 may be failed due to the incorrect authentication key. When the connection between the home appliance 40 and 40a and the AP apparatus 30 is failed, it may take a certain period of time that the user receives feedback information about the failure, and there may be inconvenience, which is a user repeatedly performs a process of selecting the AP apparatus 30 and inputting an authentication key. However, as mentioned above, since the first terminal device 10 generates network setting information only when an authentication key to the selected AP apparatus 30 is correct, there may be no errors in network setting information transmitted to the home appliance 40 and 40a, and thus there may be no possibility of failing when the home appliance 40 and 40a is connected to the AP apparatus 30 as far as there is no problems in the AP apparatus 30.

Figure 6:
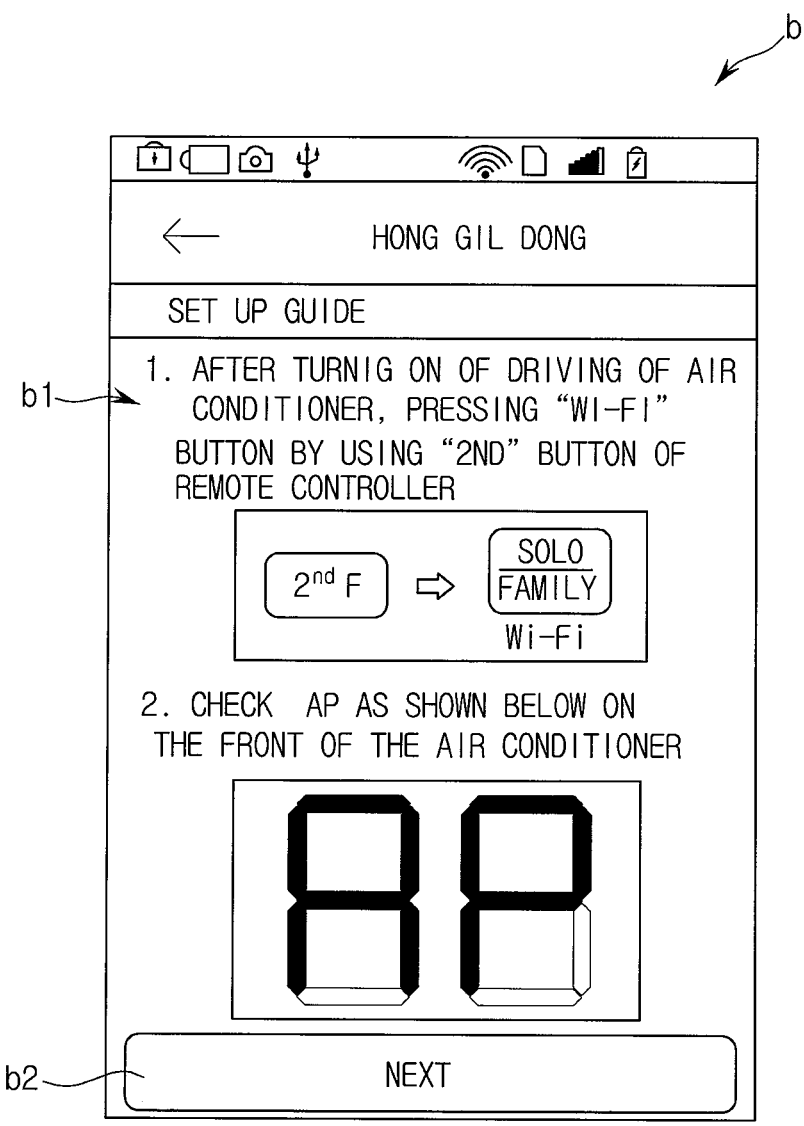
FIGS. 6 and 7 are views illustrating an exemplary screen displayed on an external terminal device while setting a home appliance.
Figure 7:
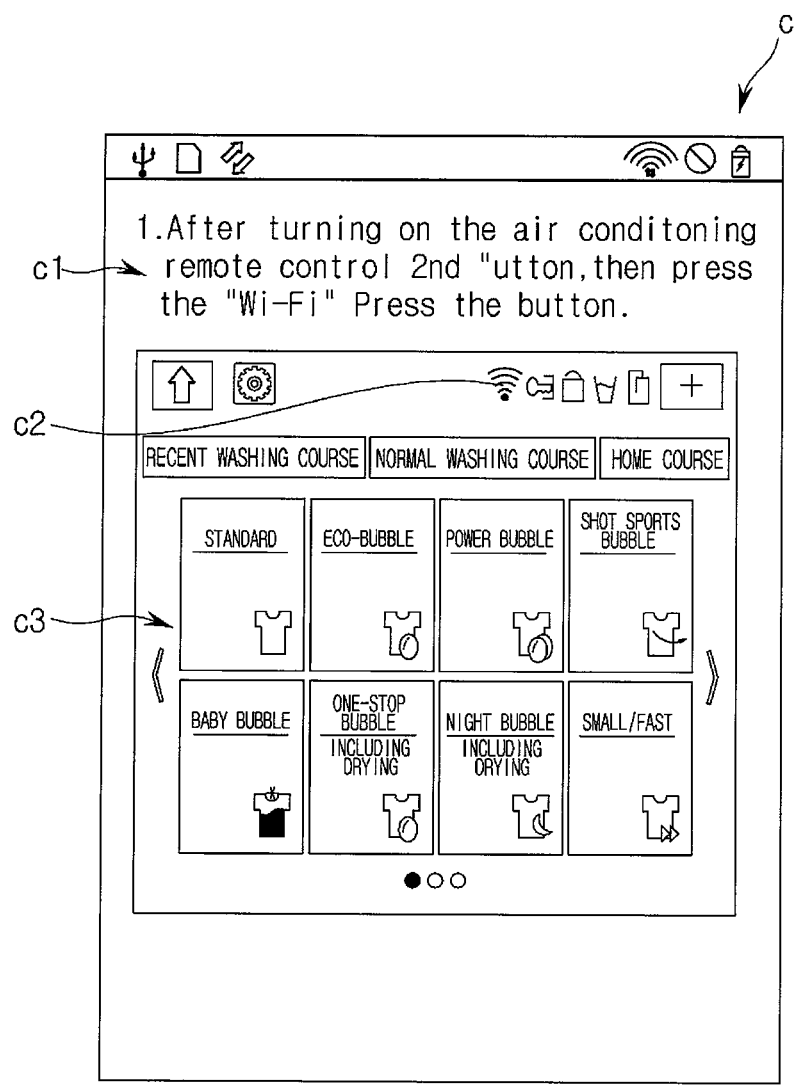

FIGS. 6 and 7 are views illustrating an exemplary screen displayed on an external terminal device while setting a home appliance. When the first terminal device 10 receives information, which is an authentication key is identical, a screen related to setting b and c, as illustrated in FIGS. 6 and 7, may be displayed to a user (s 200). For example, the first terminal device 10 may display a variety of information b1 to explain methods, such as a method of connecting the home appliance 40 and 40a to the AP apparatus 30, as illustrated in FIG. 6. Information related to a network setting method may be displayed by using at least one of text, image, sound, and video. A user may set the home appliance 40 and 40a to be a state where the home appliance 40 and 40a is capable of communicating with the first terminal device 10 or the AP apparatus 30, with reference to what displayed on a screen b of the first terminal device 10. For example, the user may set the first terminal device 10 and the AP apparatus 30 to be a communicable state by operating setting devices, such as a button, a touch screen, and a knob provided on the home appliance 40 and 40a.

When the first terminal device 10 is a device provide with a touch screen, the first terminal device 10 may further display a next content display button b2 configured to provide additional information to a user.

As needed, the first terminal device 10 may display text information c1 about a method of connecting the home appliance 40 and 40a to the AP apparatus 30, as illustrated in FIG. 7. For example, when a display unit of the home appliance 40 and 40a is realized by a touch screen, the text information c1 may include information about that network connection setting of the home appliance 40 and 40a may be performed when a certain portion c2 of the touch screen is touched. The first terminal device 10 may display an example of a screen c3 displayed on the display unit of the home appliance 40 and 40a as well as the text information c1 so that convenience for user understanding may be achieved.

Meanwhile, when receiving information that an authentication key is not correct, the terminal device 10 may output an error message and a request message of inputting an authentication key again.

Figure 8:
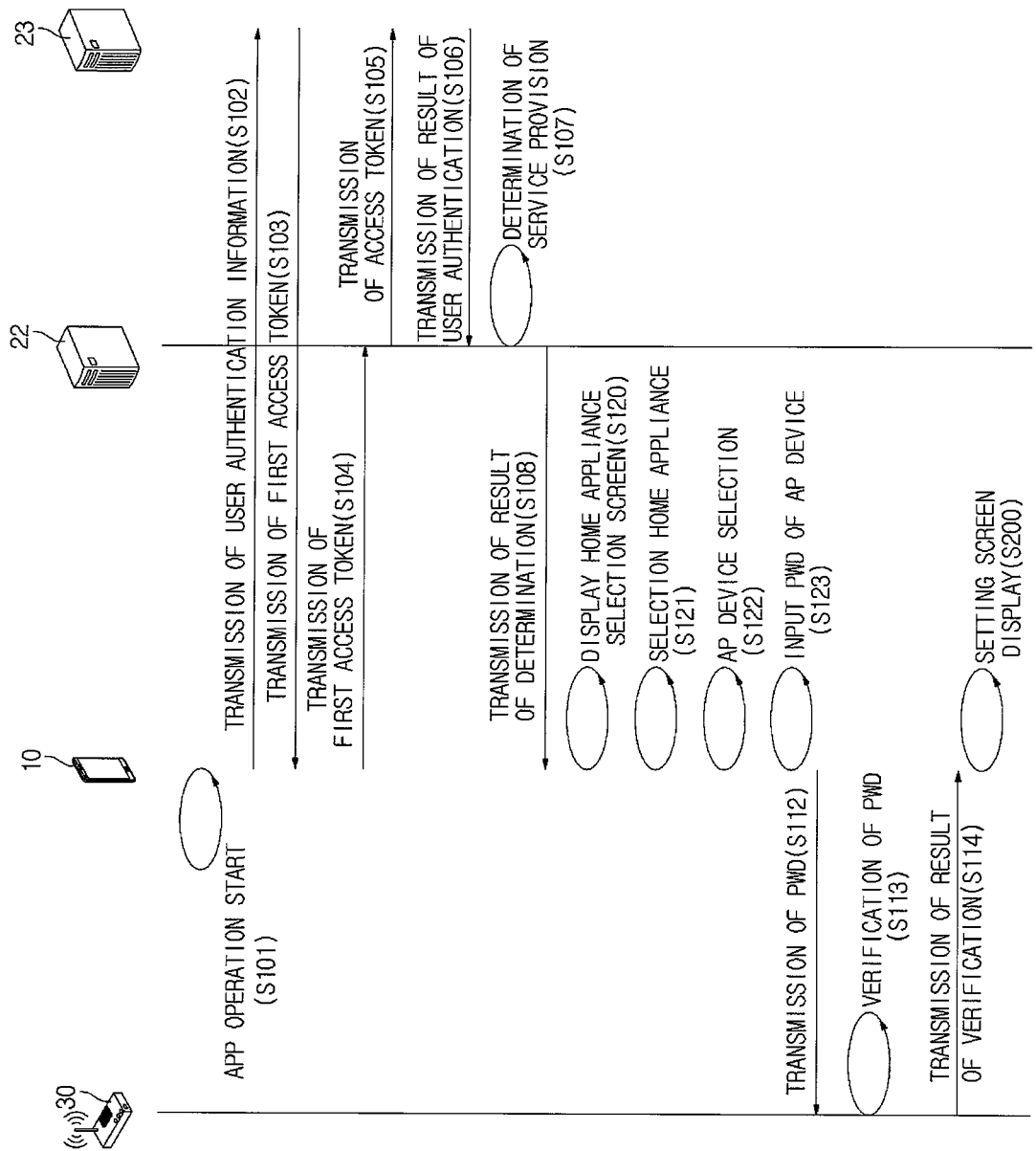
FIG. 8 is a flow chart illustrating a process of displaying a method of setting home appliance on an external terminal device in accordance with another embodiment of the present disclosure.

FIG. 8 is a flow chart illustrating a process of displaying a method of setting home appliance on an external terminal device in accordance with another embodiment of the present disclosure. As illustrated in FIG. 8, a network connection method of home appliance may further include s 120 and s 121 for selecting at least one home appliance 40 as a home appliance subject to be access to the AP appliance 30 among the plurality of home appliance 40 and 40a, which are intended to be a network connection. As the same as illustrated in FIG. 2, when an application is operated in the first terminal device 10 (s 101), the user authentication information may be transmitted to the third server device 23 (s 102), and the third server device 23 may transmit the first access token to the first terminal device 10. The first terminal device 10 may transmit the first access token to the second server device 22 so that network connection of the home appliance 40 and 40a may be set (s 104 to s 108).

Figure 9:
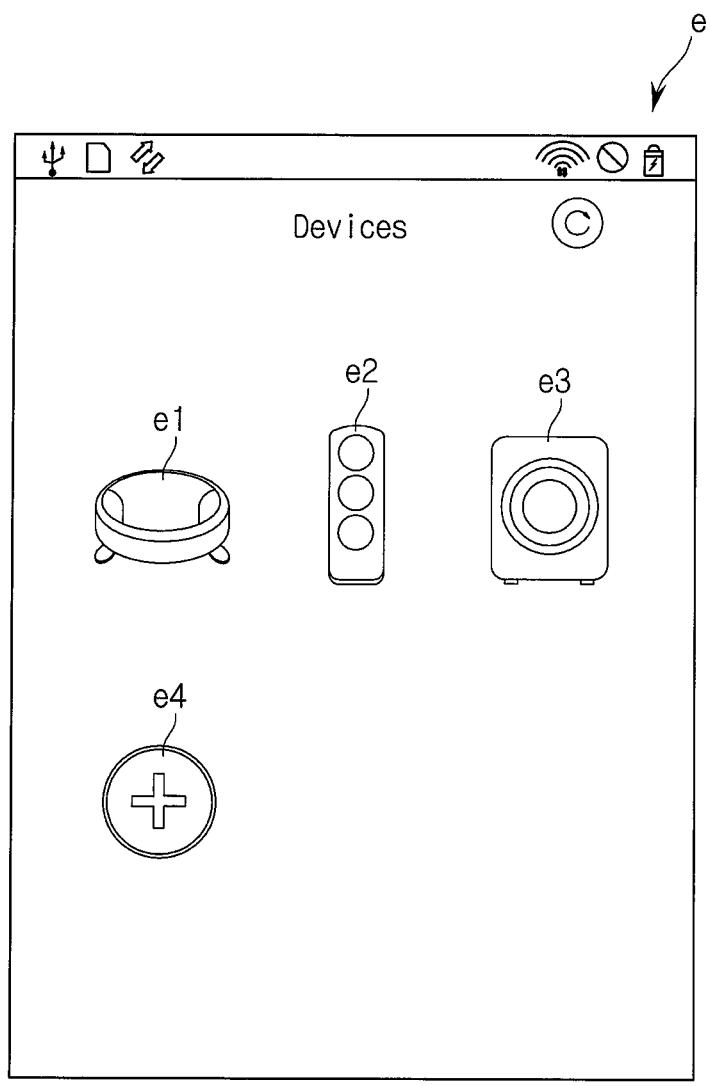
FIG. 9 is a view illustrating an exemplary screen displayed on an external terminal device while setting home appliance.

FIG. 9 is a view illustrating an exemplary screen displayed on an external terminal device while setting home appliance. As mentioned above, when the first terminal device 10 obtains an authority of setting up network connection of home appliance, the first terminal device 10 may display an appliance selection screen e configured to select an appliance, as illustrated in FIG. 9, by using an application installed in the first terminal device 10 (s 120). Selection tools, such as an icon, configured to select at least one home appliance among the plurality of home appliances as a home appliance subject to access to the AP appliance, may be displayed on the appliance selection screen e of the first terminal device 10. When a display unit of the first terminal device 10 is realized by a touch screen, the selection tools may include a plurality of buttons e1 to e3 operated by a touch. The plurality of buttons e1 to e3 may be realized by an image having a shape of an external appearance of the home appliance so that a user may intuitionally select a home appliance, which is subject to setting up network connection. The first terminal device 10 may display the plurality of buttons e1 to e3 corresponding to a plurality of home appliances based on pre-stored information related to the plurality of home appliances. The pre-stored information related to the plurality of home appliances may be previously stored in the application by a system designer, or may be transmitted from a corresponding home appliance, may be transmitted from a separated server device, or may be directly inputted from a user. In order that a user selects home appliances having high possibility of being registered to the first terminal device 10, such as a refrigerator, a washing machine, an air conditioner, a robot cleaner, an oven, or a TV, the appliance selection screen e may include selection buttons e1 to e3 corresponding to the home appliances. The appliance selection screen e of FIG. 9 illustrates an example of displaying selection buttons e1 to e3 corresponding to the plurality of home appliances, but when the first terminal device 100 stores information related to a single home appliance, the appliance selection screen e of FIG. 9 may illustrate a selection button corresponding to a single home appliance.

The user may select the home appliance 40 and 40a corresponding to selected selection tools e1 to e3 among the plurality of home appliances by touch operating at least one of the plurality of selection buttons e1 to e3 (s 121). When the home appliance 40 and 40a is selected, the AP apparatus 30 to which the home appliance 40 and 40a is connected may be selected (s 122). The AP apparatus 30 may be automatically selected by the first terminal device 10 or may manually be selected by a user. When the AP apparatus 30 is selected, the user may input an authentication key to the AP apparatus 30 to the AP apparatus 30 (s 123). The selection and determination of the AP apparatus 30 (s 122) and the input of authentication key (s 123) may be the same as the selection of the AP apparatus 30 (s 110) and the input of authentication key (s 111) of FIG. 2. The first terminal device 10 may transmit an authentication key to the AP apparatus 30 to the AP apparatus 30 (s 112). The AP apparatus 30 may verify the authentication key (s 113) and may transmit a result of verification to the first terminal device (s 114). When receiving the result of verification that is the authentication key is correct, the first terminal device 10 may display a screen related to setting, as illustrated in FIG. 6 or 7, (s 200). From the transmission of the authentication key to the first terminal device 10 to the displaying of the screen related to setting (s 112 to s 200) may be the same as the description of FIG. 2.

Hereinafter a case where a user selects at least one home appliance image among home appliance images e1 to e3 to register a corresponding home appliance to the first terminal device 10 will be described in detail as an example. For example, when the user selects a home appliance image, such as an air conditioner image e2, among the home appliance images e1 to e3 displayed on a screen of the first terminal device 10, according to an operation procedure programmed on an application installed in the first terminal device 10, a manual for air conditioner operation may be displayed on a screen of the first terminal device 10 so that an air conditioner may perform a network communication with the first terminal device 10.

The home appliance 40, such as an air conditioner, may use a wireless communication, such as, Wi-Fi Direct, Bluetooth™, near field communication (NFC) to perform network communication with the first terminal device 10, but the home appliance 40 is not always prepared for the network communication and thus operation methods to prepare the network communication may be different from each other according to each appliance. For convenience, a state where a home appliance is ready to perform a network communication with an external device may be referred to as 'AP mode'. For the network communication between the home appliance and the first terminal device 10, the home appliance 40, which is intended to perform a network communication with the first terminal device 10, is in the AP mode and the first terminal device 10 also operates a wireless communication module, such as Wi-Fi direct. Therefore, in the displaying of the home appliance selection screen (s 130), when a user selects an air conditioner image e2, a manual, which is for a user to inform how to operate an air conditioner to convert into a AP mode, as illustrated in FIG. 6, may be displayed.

When the user operates the air conditioner as the manual displayed on the first terminal device 10, the air conditioner may be converted into the AP mode. In addition, when the user selects a command input unit b2 configured to proceed with a following step to register a home appliance, as illustrated in FIG. 6, the first terminal device 10 may start to search a home appliance in an AP mode in the surroundings by operating a wireless communication module, such as Wi-Fi direct. When the user selects an air conditioner searched by the first terminal device 10, a pairing between the first terminal device 10 and the air conditioner may be performed to perform the network communication with each other.

Figure 10:
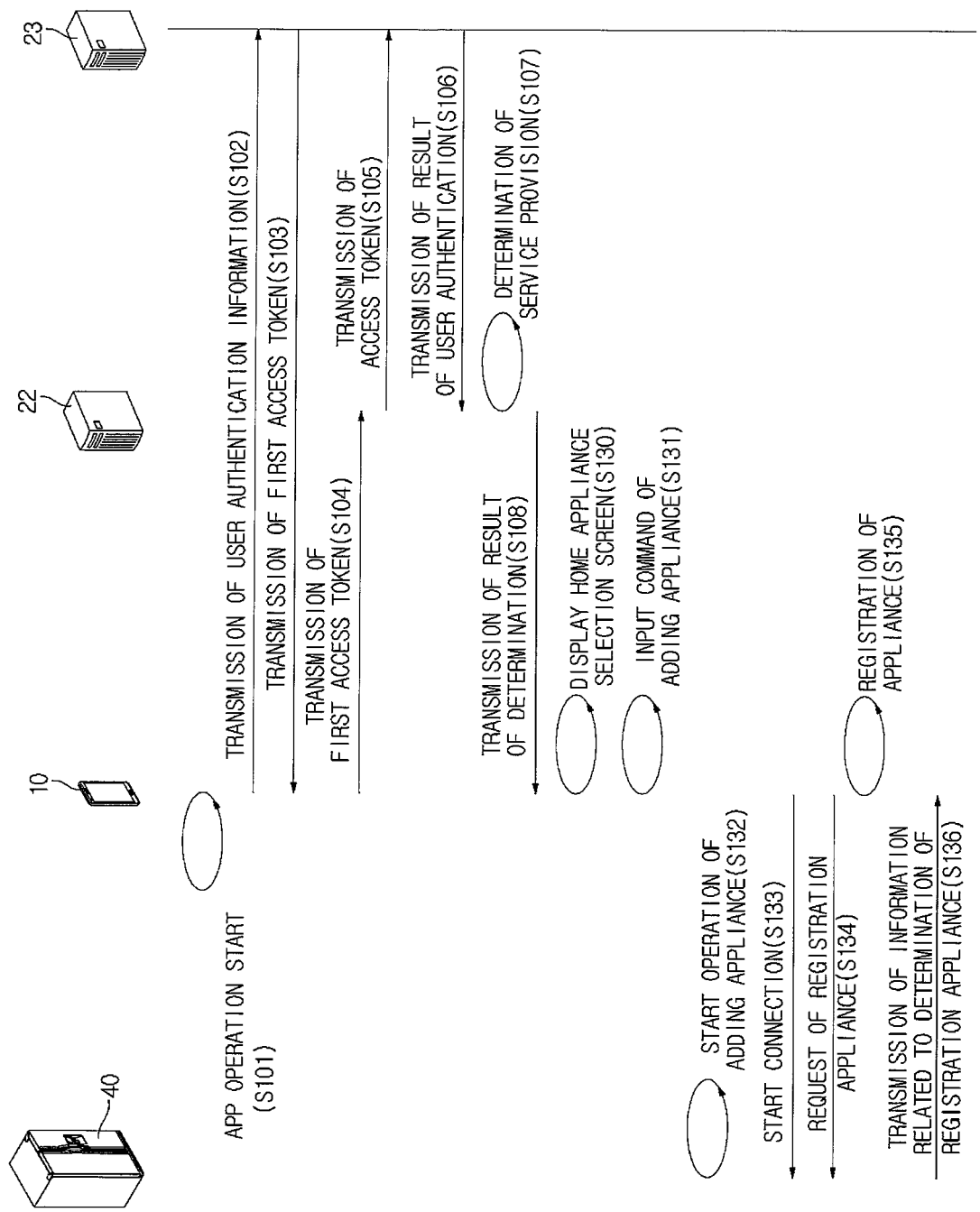
FIG. 10 is a flow chart illustrating a process of registering a home appliance, which is to communicate with a first terminal device, at the first terminal device in accordance with one embodiment of the present disclosure.

FIG. 10 is a flow chart illustrating a process of registering a home appliance, which is to communicate with a first terminal device, at the first terminal device in accordance with one embodiment of the present disclosure. Referring to FIG. 10, a network connection method of home appliance may include an appliance registration process. Particularly, the network connection method of home appliance may further include s 130 and s 131 for storing information related to at least one home appliance capable of setting a network connection to the first terminal device 10, as a home appliance to access to the AP apparatus 30. From starting application operation to transmitting a result of determination (s 101 to s 108) may be the same as the description as illustrated in FIGS. 2 and 8. As illustrated in FIG. 10, when the first terminal device 10 obtains an authority of setting up network of home appliance, the first terminal device 10 may display a home appliance selection screen e, as illustrated in FIGS. 9 and 10 (s 130). The home appliance selection screen e may include an addition tool configured to add a home appliance. When a display unit of the first terminal device 10 is realized by a touch screen, the home appliance addition tool may include an addition button e4 operated by a touch. The addition button e4 may be realized by an image, such as plus symbol (+), so that a user may intuitionally select a home appliance, which is subject to network connection setting. The user may select an image of a home appliance to be registered among images displayed on the home appliance selection screen e of the first terminal device 10. When an image of a home appliance to be registered is absent among images displayed on the home appliance selection screen e, a command of adding an appliance may be inputted by operating the addition button e4 (s 131).

The communication module of the home appliance 40 may be driven to communicate with the first terminal device 10, and the home appliance 40 and the first terminal device 10 may perform a communication with each other by using each communication module (s 134). In this case, the home appliance 40 and the first terminal device 10 may perform a communication with each other by using WiFi direct. When the home appliance 40 and the first terminal device 10 are connected to each other, the home appliance may transmit a device registration request to the first terminal device 10. In this case, the home appliance 40 may transmit information related to home appliance to the first terminal device 10 (s 134). The information related to home appliance may include identification number to identify the home appliance. The identification number may include at least one of serial number of the home appliance 40, internet protocol (IP) address of the home appliance 40, mac address of the home appliance. When receiving the information related to the home appliance 40, the first terminal device 10 may register the home appliance 40 by storing the received information. The first terminal device 10 may display the registered home appliance 40 as the selection button e1 to e3 on the device selection screen e, as illustrated in FIG. 9. As needed, the first terminal device 10 may transmit information related to determination of device registration and registration to the home appliance 40. The home appliance 40 may receive the information related to determination of registration and registration, and store the information related to determination of registration and registration. When the first terminal device 10 tries to control the home appliance 40 from the outside, the home appliance 40 may determine whether to accept the control of the first terminal device 10 based on the received information related to determination of registration and registration.

Figure 11:
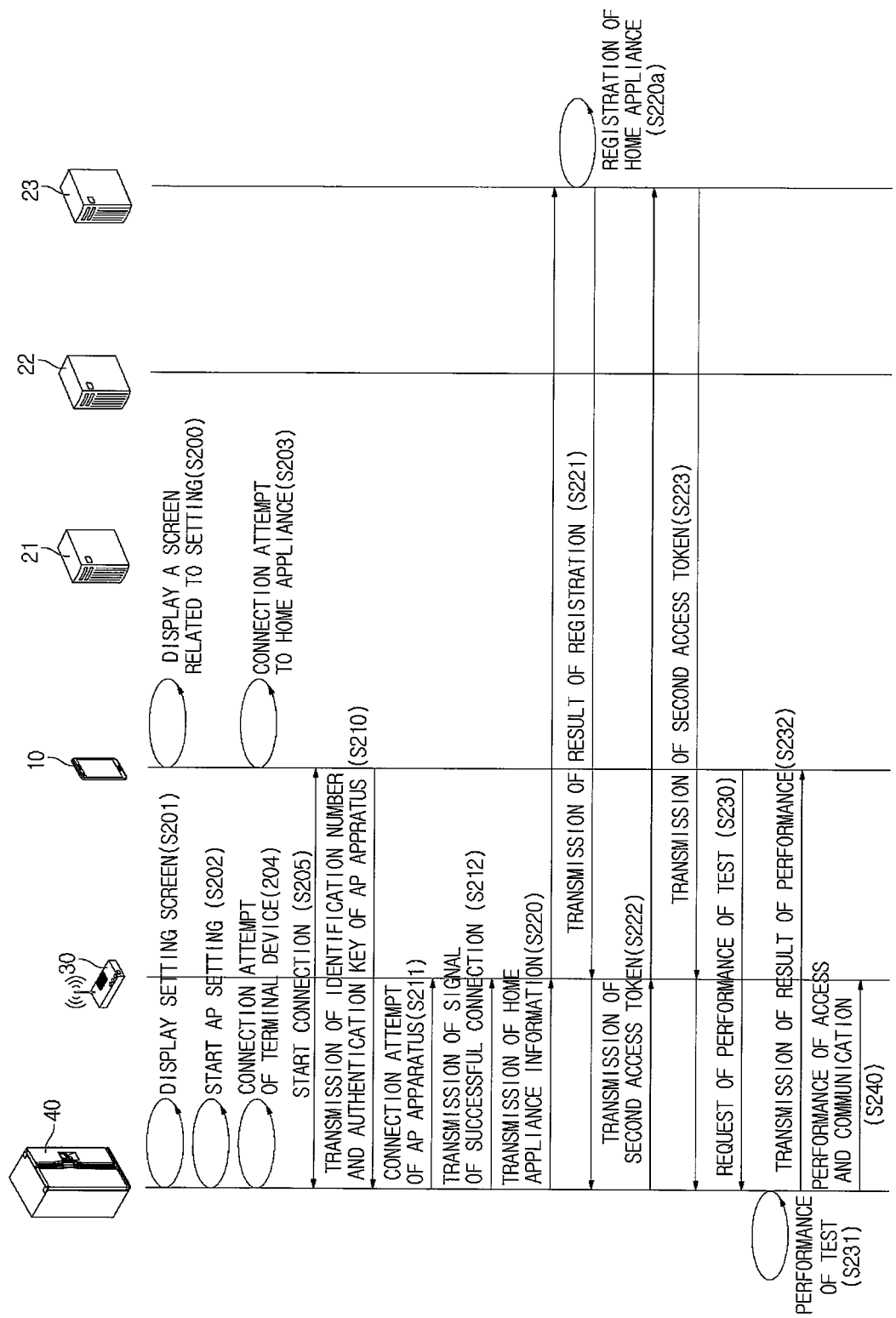
FIG. 11 is a flow chart illustrating a process of connecting a home appliance to a AP apparatus.

FIG. 11 is a flow chart illustrating a process of connecting a home appliance to an AP apparatus. As described with reference to FIGS. 2 to 10, when the first terminal device 10 displays a screen related to setting (s 200), the home appliance 40 may display a setting screen for setting up a network (s 201), and an access point (AP) connection mode configured to allow the home appliance 40 to be connected to the AP apparatus may be started (s 202). According to one embodiment, the home appliance 40 may receive an input of an instruction of starting the AP connection mode from a user via an input unit, such as a mechanical button, a touch screen, and the likes. In addition, the home appliance 40 may receive an input of the instruction of starting the AP connection mode from a user by a remote controller by using NFC or infrared rays. For example, a user may operate a mechanical button, a touch screen of the home appliance 40, or a remote controller of the home appliance 40 so that the home appliance 40 may enter the AP connection mode. When the AP connection mode is started, the home appliance 40 may display a certain setting screen. According to another embodiment, the home appliance 40 may enter the AP connection mode according to a control command transmitted from the first terminal device 10.

When the home appliance 40 starts the AP connection mode, the home appliance 40 and the first terminal device 10 may try to connect to each other via a wired/wireless communication network (s 204 and s 203). Here the wireless communication network may be a communication network by using Wi-Fi direct. When the home appliance 40 and the first terminal device 10 are connected each other via a wired/wireless communication network (s 205), the first terminal device 10 may transmit an identification number and an authentication key of the AP apparatus 30 to the home appliance 40 (s 210). The identification number of the AP apparatus 30 may be previously stored in the first terminal device 10. The authentication key of the AP apparatus 30 may be inputted by a user (s 111 of FIG. 2), and may be correct due to verified independently by the first terminal device 10 (s 113 of FIG. 2). According to embodiments, the first terminal device 10 may transmit a unique identification number. For example, the unique identification number may be a temporary identification number to be used at a time when the home appliance 40 is connected to the AP apparatus 30. Information transmitted from the first terminal device 10 to the home appliance 40 may be transmitted after being encrypted. The home appliance 40 may try to connect to the AP apparatus 30 by using the received the identification number and authentication key of the AP apparatus 30 (s 211). For example, the home appliance 40 may try to connect to the AP apparatus 30 by using a wireless communication system, such as Wi-Fi, or NFC. The home appliance 40 may temporarily or non-temporarily store the received the identification number and authentication key of the AP apparatus 30 in a storage device built in the home appliance 40. The storage device may include a disk storage device and a semiconductor memory device.

As the home appliance 40 transmits the identification number and the verified authentication key of the AP apparatus 30 to the AP apparatus 30, the home appliance 40 may be successfully connected to the AP apparatus 30 without failure. The AP apparatus 30 may transmit information related to successful connection to the home appliance 40 (s 212). When the connection with the AP apparatus 30 succeeds, the home appliance 40 may transmit information about the home appliance 40 to the third server device 23 via the AP apparatus 30 (s 220). The reason of which the home appliance 40 is successfully connected to the AP apparatus 30 at the same time while accessing to the third server device 23 is that it is already programmed in micro controlling unit (MCU) built-in the home appliance 40. In other words, it means that when the home appliance 40 succeeds in initial connection to internet network, Internet Protocol address to be connected has already been programmed in the MCU of the home appliance 40. Therefore, when the home appliance 40 is connected to the AP apparatus 30, the home appliance 40 may determine to be connected to Internet network, and may access to the third server device by using pre-determined IP address.

The third server device 23 may receive information about the home appliance 40 and may register the received information about the home appliance 40 to a user account as a home appliance (s 220a). The user account may be previously stored in the third server device 23. The user account pre-stored in the third server device 23 may be related to the first terminal device 10 and the second terminal device 11. For example, the user account pre-stored in the third server device 23 may be assigned to each serial number of the first terminal device 10. The user account may be generated when a user accesses to the third server device 23. As mentioned above, the first terminal device 10 may receive the first access token by accessing to the third server device 23 (s 103). When the first terminal device 10 transmits an identification number and an authentication key of the AP apparatus 30 to the home appliance 40 (s 210), because of transmitting the first access token to the home appliance 40, the home appliance 40 may automatically access to a user account registered in the third server device 23 by using the received first access token, and the third server device 23 may register the home appliance 40 at a user account of the first terminal device 10. According to embodiments, the first terminal device 10 may store used user authentication information by accessing to the third server device 23 and when the first terminal device 10 transmits an identification number and an authentication key of the AP apparatus 30 to the home appliance 40 (s 210), the user authentication information may be transmitted at the same time, and thus the home appliance 40 may automatically access to a user account registered to the third server device 23 by using the received user authentication information. At this time, the user authentication information may include at least one of a user identification number (ID) and password for authentication.

Figure 12:
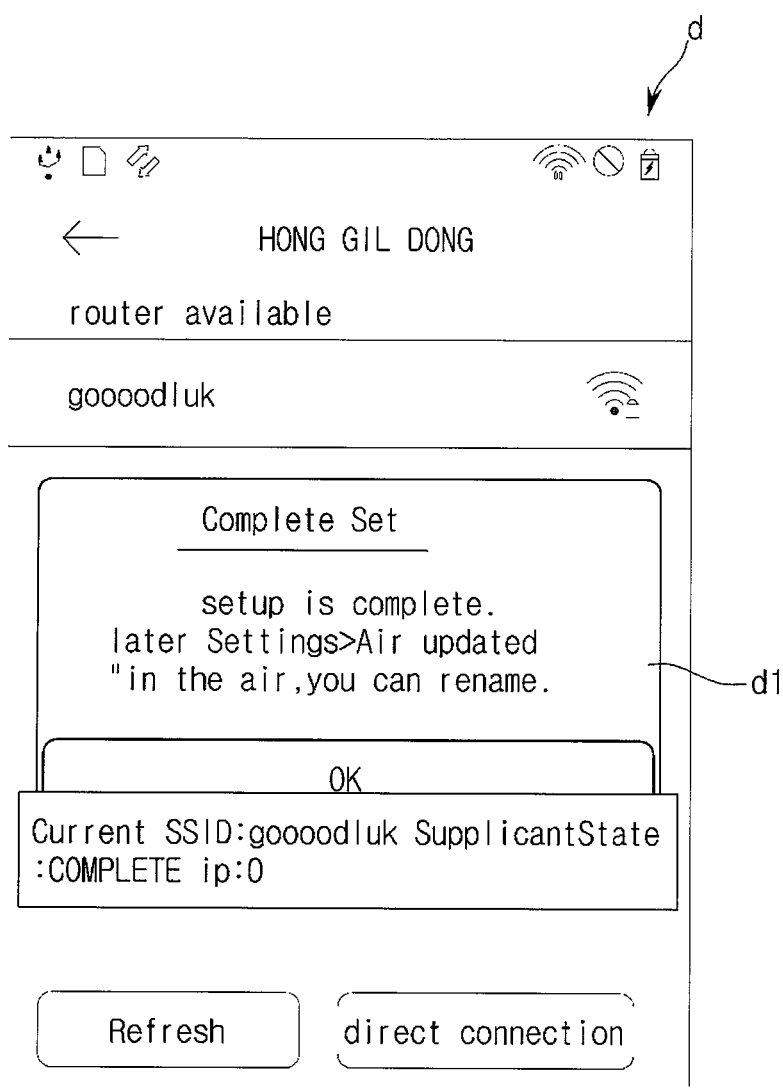
FIG. 12 is a view illustrating an exemplary screen displayed on a terminal device while setting home appliance.

As mentioned above, when the home appliance 40 is registered to the user account of the third server device 23, the third server device 23 may transmit information that is the home appliance 40 is registered to the user account, to the first terminal device 10. The first terminal device 10 may output an indication of completion of registering home appliance on a screen as illustrated in FIG. 12.

In addition, the third server device 23 may transmit a result of registration of the home appliance 40 to the home appliance 40 (s 221). The home appliance 40 may receive the result of registration, and may transmit a request signal requesting the second access token to the third server device 23 in response to the received result of registration. In response to the request signal of the home appliance 40, the third server device 23 may transmit the second access token related to an access authority of network connection of the home appliance 40 to the home appliance 40 (s 223). According to embodiments, other server devices 21 and 22 other than the third server device 23 may receive a request signal of the second access token and may transmit the second access token to the home appliance 40. In addition, receiving a request signal of the second access token and transmitting the second access token may be performed by another device, which is not shown in drawings. A variety of data transmitted from the home appliance 40 to the third server device 23, and a variety of data transmitted from the third server device 23 to the home appliance 40 may be transmitted after encrypted. Depending on reception of the second access token, the home appliance 40 may be connected to an external network via the AP apparatus 30. FIG. 12 is a view illustrating an exemplary screen displayed on a terminal device while setting home appliance. According to an embodiment, when the home appliance 40 is connected to the external network, the home appliance 40 may transmit information related to successful connection to an external network to the first terminal device 10. The first terminal device 10 may display a screen d related to completion of connection, as illustrated in FIG. 2, on a display unit in response to reception of information related to successful connection to the external network. The screen d related to completion of connection may include a message dl of completed connection.

According to an embodiment, the first terminal device 10 may transmit a request signal of performing test to perform test to the home appliance 40 (s 230). In response to reception of the request signal of performing test, the home appliance may perform network connection test for at least one of the presence of network connection, reliability of network connection, a network speed (s 231). The result of determination of test may be transmitted to the first terminal device 10 (s 232).

As mentioned above, when the home appliance 40 accesses to the AP apparatus 30 or the network connection test is completed, the home appliance 40 may perform a communication by accessing to the external network via the AP apparatus 30 (s 240). In this case, the home appliance 40 may access to the external network according to the second access token.

Hereinafter a setting method of network connection of home appliance by using a second terminal device different from the first terminal will be described with reference to FIGS. 13 and 14.

Figure 13:
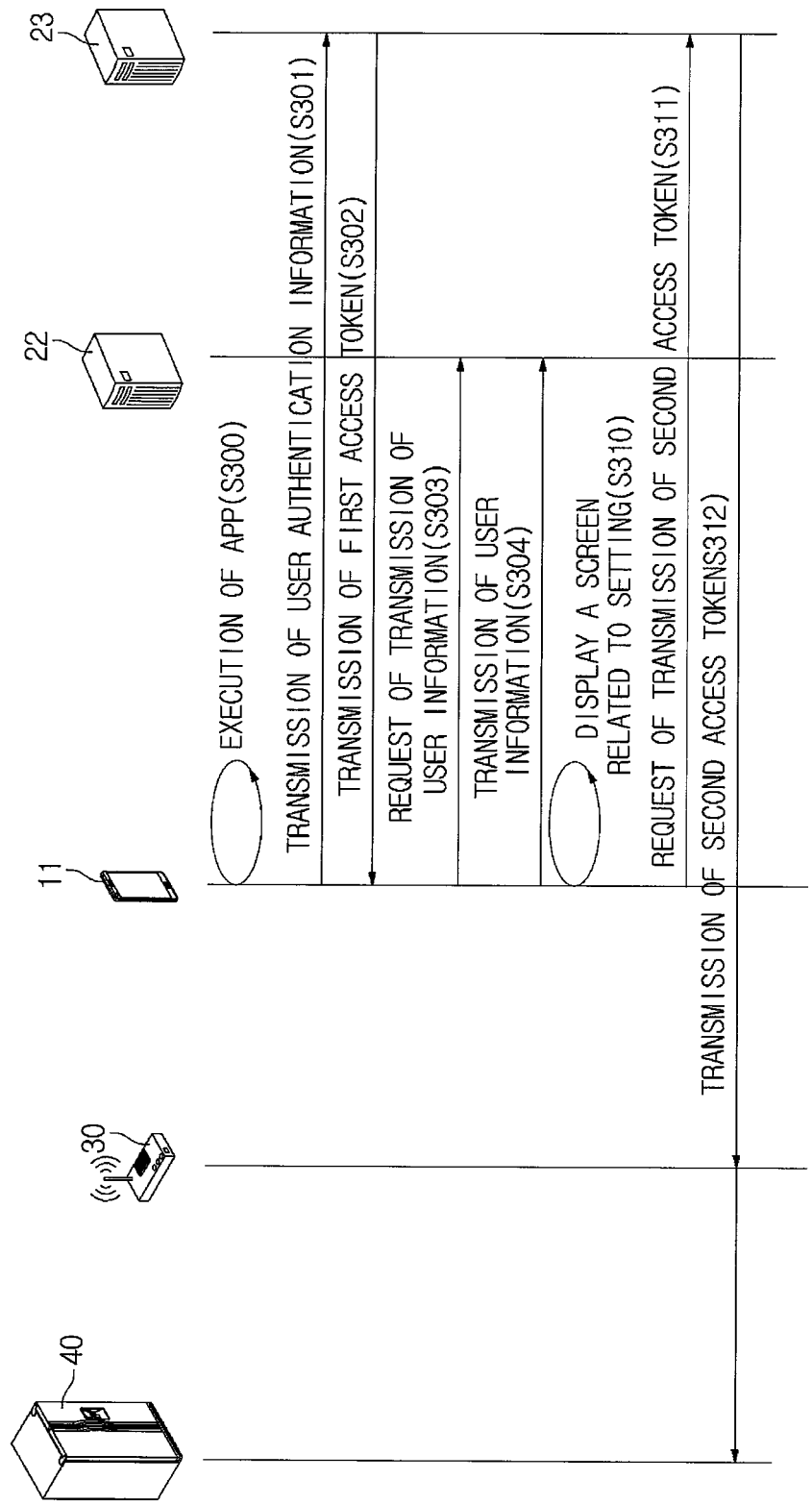
FIG. 13 is a flow chart illustrating a network connection method of home appliance by using a second terminal device in accordance with one embodiment of the present disclosure.

FIG. 13 is a flow chart illustrating a network connection method of home appliance by using a second terminal device in accordance with one embodiment of the present disclosure. As illustrated in FIG. 13, a network connection of home appliance may be set up by using the second terminal device 11 different from the first terminal 10. In this case, according to an embodiment, the home appliance 40 may be connected to the AP apparatus 30 (s 320). The home appliance 40 may obtain an access authority of the AP apparatus 30 by using an authentication key and an identification number of the AP apparatus 30 received from at least one of the first terminal device 10 and the second terminal device 11, and then the home appliance 40 may be connected to the AP apparatus 30 by using the obtained access authority. For setting up a network connection of home appliance by using the second terminal device 11, an application may be executed in the second terminal device 11 (s 300). The application may be received from the first server device 21 and may be installed. When the application is executed, the second terminal device 11 may receive an input of authentication information to authenticate a user and may transmit the received user authentication information to the third server device 23 (s 301). The user authentication information may include at least one of user identification number and password for authentication. The user authentication information may be the same as or different from authentication information transmitted from the first terminal device 10 at the above-mentioned as s 102. The second terminal device 11 may receive an input of user identification number and password for authentication from a user. In this case, the second terminal device 11 may display an input window to receive an input of the user identification number and password for authentication on a display unit. The second terminal device 11 may previously store the user identification number and password for authentication. The user authentication information may be encrypted for security before transmitted to the third server device 23. After the third server device 23 receives authentication information and performs user authentication based on the received authentication information, the first access token related to an authority of setting network of the home appliance 40 may be transmitted to the second terminal device 11 when the user authentication succeeds (s 302).

When receiving the first access token, the second terminal device 11 may request of transmitting of user information to the second server 22 (s 303). The user information may include a variety of information and an authority which is needed for network connection setting of the home appliance 40. According to embodiments the second terminal device 11 may request an authority to access the home appliance 40 by transmitting the first access token to the second server device 22. The second server device 22 may receive a request signal of user information transmission and may transmit the user information to the second terminal device 11 in response to the request signal of user information transmission (s 304). When receiving the user information, the second terminal device 11 may display a screen related to setting on a display unit of the second terminal device 11 (s 310). As illustrated in FIG. 13, the second terminal device 11 may not receive an authentication key to a separated AP apparatus 30. Therefore, a user may easily connect the home appliance 40 to a network without inputting an additional authentication key after authenticating by using a temporary authentication key.

After a screen related to setting is displayed (s 310), the second terminal device 11 may transmit a request signal of transmitting the second access token to the third server device 23 (s 311). According to embodiments, the second terminal device 11 may request the second access token to other servers 21 and 22 other than the third server device 23. The third server device 23 may receive the request signal of transmitting the second access token, and then in response to the request signal of transmitting the second access token, the third server device 23 may transmit the second access token to the home appliance 40 (s 312). In this case, the second access token may be transmitted to the home appliance 40 via the AP apparatus 30. The home appliance 40 may receive the second access token and may be connected to an external network according to the received second access token. The home appliance 40 may access to the AP apparatus 30, and may be connected to the external network via accessed the AP apparatus 30.

Figure 14:
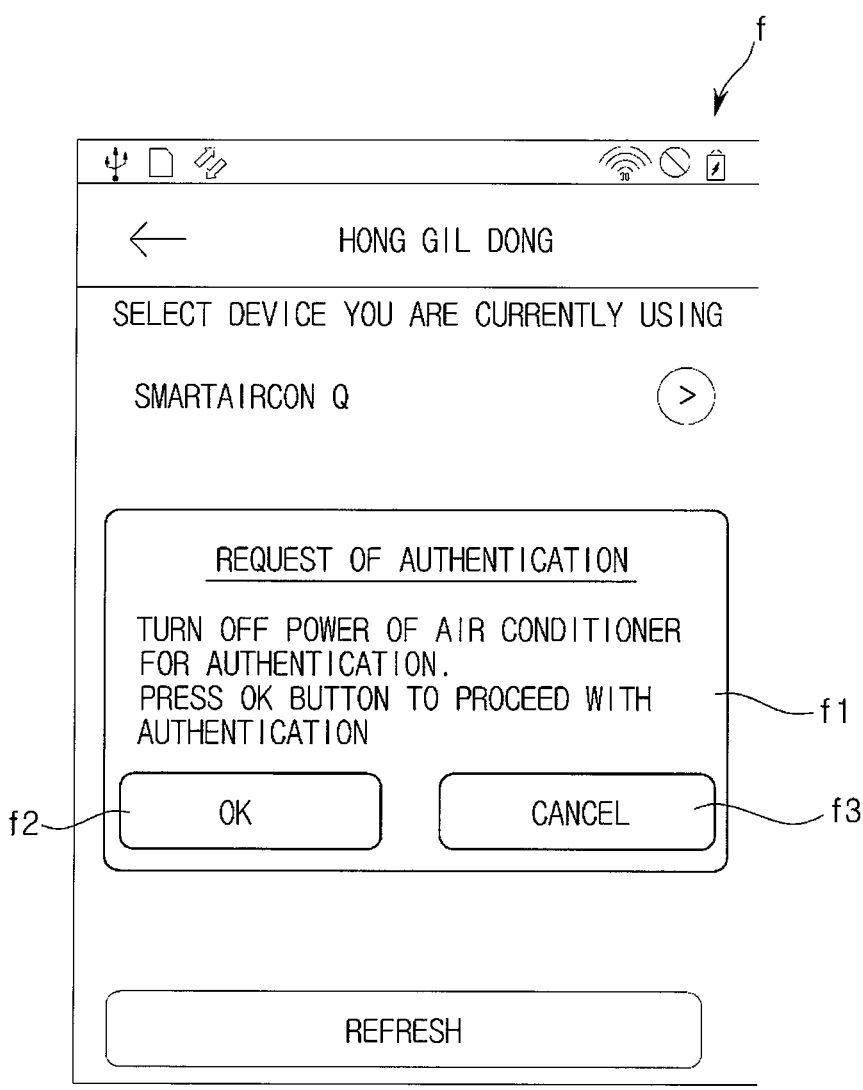
FIG. 14 is a view illustrating an exemplary screen displayed on an external terminal device during a process of setting a network connection of home appliance by using a second terminal device.

FIG. 14 is a view illustrating an exemplary screen displayed on an external terminal device during a process of setting a network connection of home appliance by using a second terminal device. When the second terminal device 11 performs a communication with the second server device 22 (s 303 and s 304) or sets network connection of the home appliance 40, the second terminal device 11 may display an authentication screen f, as illustrated in FIG. 14. An authentication screen f may be a screen related to setting displayed on a display unit of the second terminal device 11. The authentication screen f may include a display window f1 displaying a description of the user action required for the authorization. The display window f1 may include an OK button f2 and a cancel button f3 to receive an input of an instruction of a user about whether to proceed or to cancel the next step.

Figure 15:
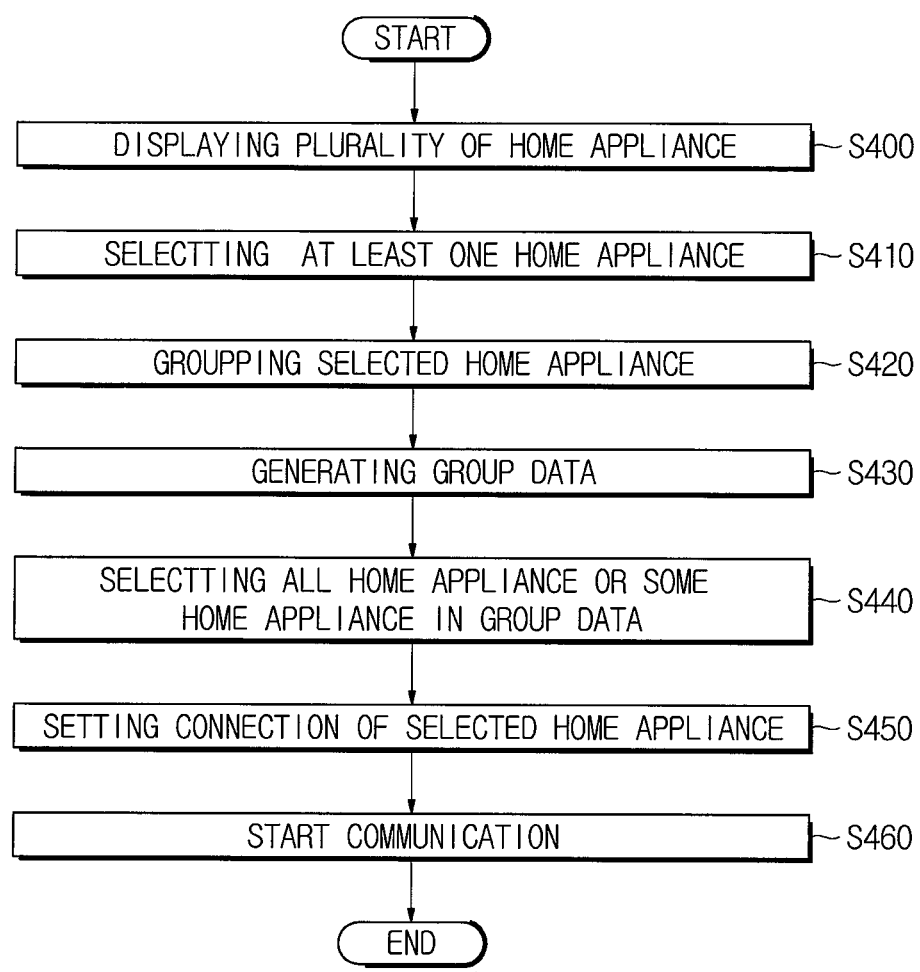
FIG. 15 is a flow chart illustrating a process of setting a network connection of a plurality of home appliances in accordance with one embodiment of the present disclosure.
Figure 16:
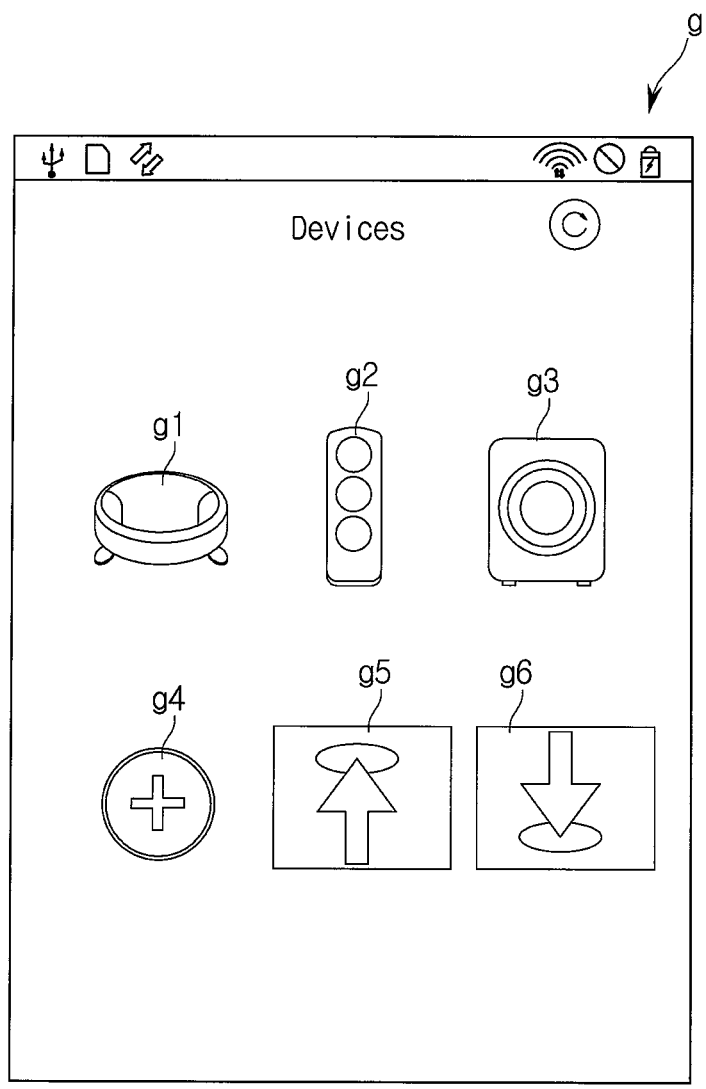
FIGS. 16 to 19 are views illustrating an exemplary screen displayed on an external terminal device during a process of setting a network connection of a plurality of home appliances.
Figure 17:
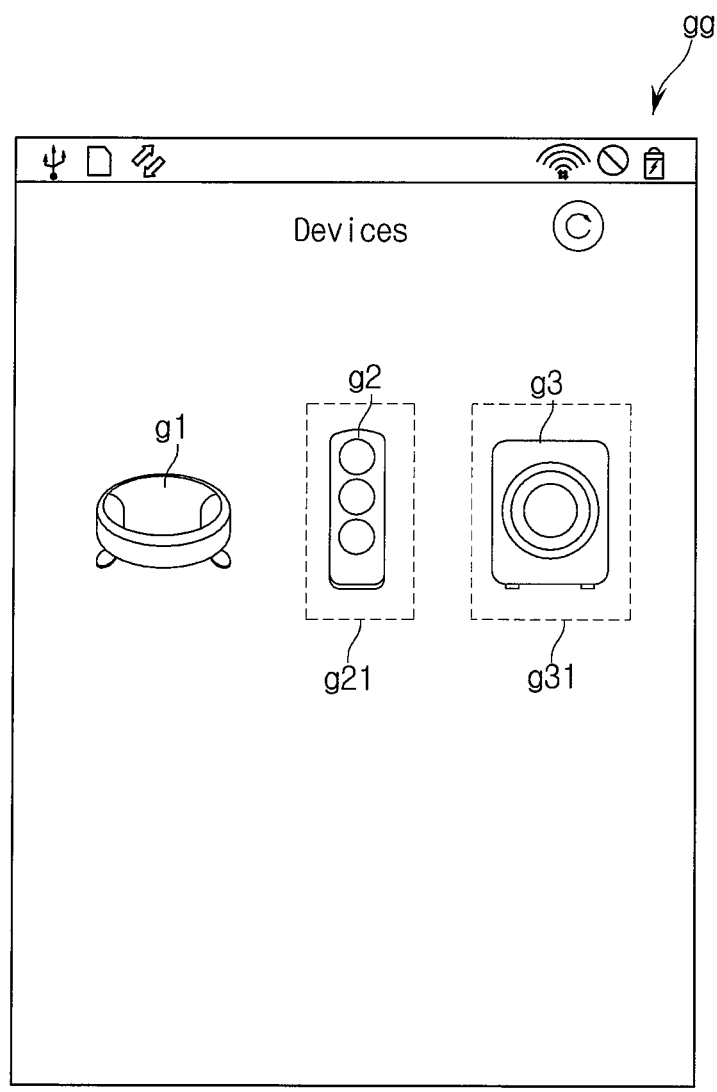
Figure 18:
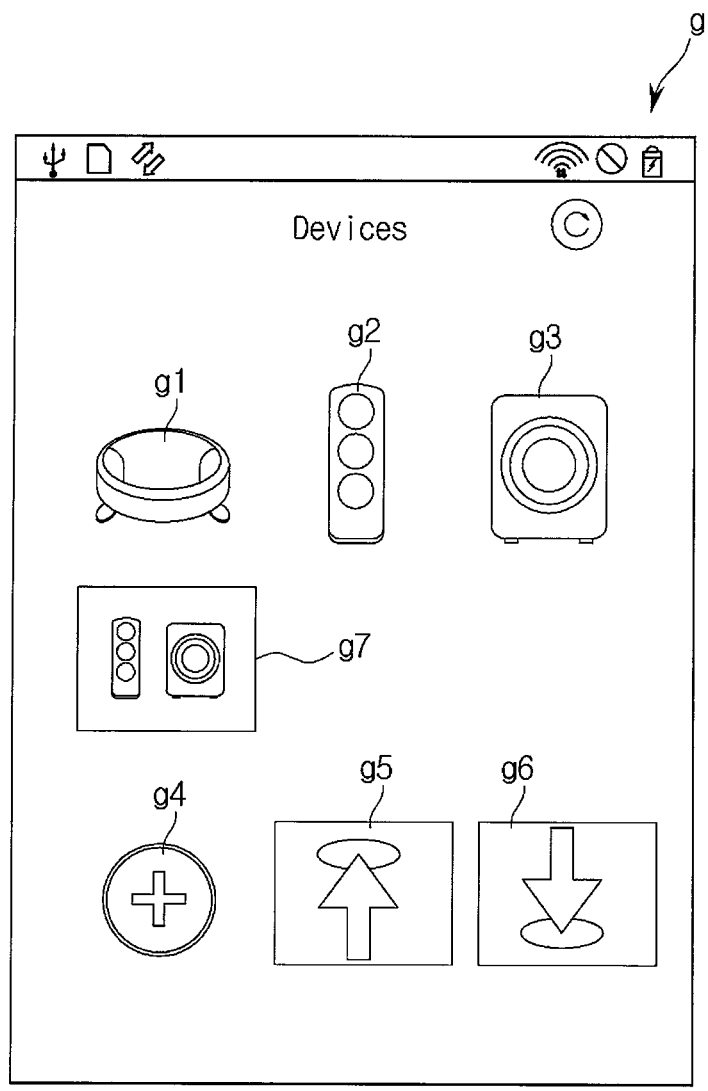

Hereinafter a method of network connection of the plurality of home appliances will be described with reference to FIGS. 15 to 19. FIG. 15 is a flow chart illustrating a process of setting a network connection of a plurality of home appliances in accordance with one embodiment of the present disclosure and FIGS. 16 to 19 are views illustrating an exemplary screen displayed on an external terminal device during a process of setting a network connection of a plurality of home appliances. As illustrated in FIG. 15, according to a network connection method of the plurality of home appliances, at first, the first terminal device 10 may display a group data generation screen g, as illustrated in FIG. 16. The group data generation screen g is a screen displayed to a user in order to generate at least one group data by grouping the plurality of home appliances. The group data generation screen g may include selection tools g1 to g5 indicating the plurality of home appliances (s 400). In addition, the group data generation screen g may include an addition tool g4 to add a new home appliance, a group data generation tool g5 for grouping of home appliances, and a collective call tool g6 to call generated group data. The selection tool g1 to g3, the addition tool g4, the group data generation tool g5, and the collective call tool g6 may be realized by an image so that a user intuitionally recognizes the function thereof. When the first terminal device 10 displays a group data generation screen g on a touch screen, a user may start to generate group data by touch operating the group data generation tool g5 to generate group data. The first terminal device 10 may display a device selection screen gg, as illustrated in FIG. 17, in response to the touch operation. When the device selection screen gg is displayed, a user may select at least one home appliance among the plurality of home appliances by touch operating at least one of the plurality of selection tools g1 to g3 displayed on the device selection screen gg (s 410). In this case, distinctive marks g21 and g31 may further be displayed on home appliances g2 and g3 so that the home appliances g2 and g3 selected by a user and other home appliance g1 non-selected by a user are distinguished from each other. For example, as illustrated in FIG. 17, marks g21 and g31, such as a dotted line, may be displayed around the home appliances g2 and g3. According to embodiments, animation effects, such as that the home appliances g2 and g3 are flashed, or the color of the home appliance g2 and g3 are changed, may be further displayed to distinguish the home appliance g2 and g3 selected by a user from the other home appliance g1 non-selected by a user. As mentioned above, when at least one home appliance g2 and g3 are selected, the first terminal device 10 may group at least one selected home appliance (s 420), and may generate group data including the at least one selected home appliance (s 430). When the group data is generated, the first terminal device 10 may further display a group data selection tool g7 corresponding to the generated group data on the group data generation screen g, as illustrated in FIG. 18. The group data selection tool g7 may be displayed by a certain image. The group data selection tool g7 may be displayed by a folder image to indicate a group of the plurality of home appliances.

Figure 19:
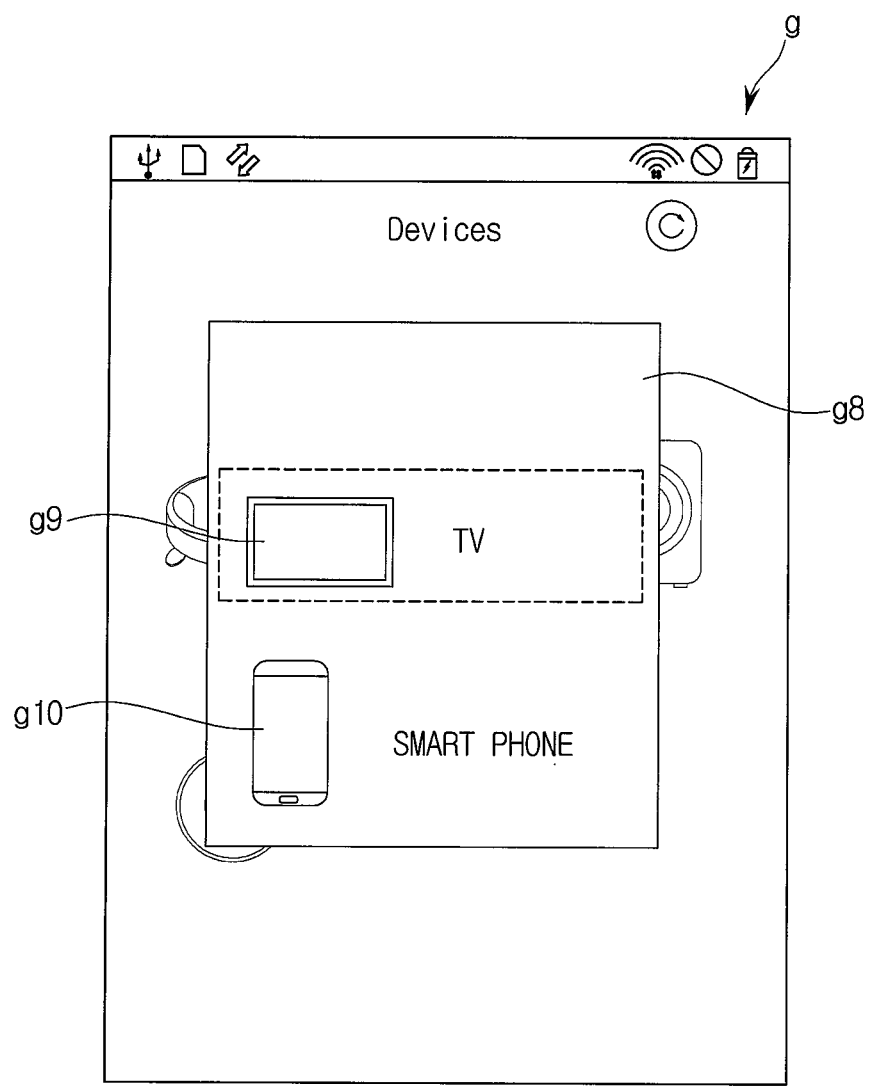

When a user set up a network connection of the home appliances 40 and 40a, the user may select at least one home appliances 40 and 40a by touching the group data selection tool g7 including at least one home appliance or the collective call tool g6, and then may perform network connection setting of the at least one home appliance 40 and 40a at the same time. In this case, the user may select group data and then may select all or some of home appliance in the group data (s 400). When a user touches the group data selection tool g7 and the collective call tool g6, the first terminal device 10 may display a group selection window g8 in which an image indicating at least one home appliance g8 and g9 is displayed, as illustrated in FIG. 19. A user may select some of home appliance g9 or all of home appliance g9 and g10 to select all of home appliance or some of home appliance in the group data. As mentioned above, the selected home appliance 40 and 40a may be connected to the AP apparatus 30 (s 450) and may be connected to an external network (s 460).

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A network connection method of a home appliance comprising:
   receiving, by a terminal device connected to an access point (AP) apparatus, an input of an authentication key of the AP apparatus from a user;
   verifying, by the terminal device, the inputted authentication key based on an authentication key of the AP apparatus stored in the terminal device;
   setting the home appliance to be in a state of communicating with the terminal device;
   connecting the home appliance and the terminal device;
   transmitting, by the terminal device, an identification number and the verified authentication key of the AP apparatus to the home appliance when the inputted authentication key is verified to be identical to the authentication key of the AP apparatus stored in the terminal device; and
   connecting the home appliance to the AP apparatus based on the identification number and the authentication key of the AP apparatus.

2. The network connection method of the home appliance of claim 1, further comprising:

displaying, by the terminal device, an operation method of setting the home appliance to be in a state of communicating with the terminal device.

3. The network connection method of the home appliance of claim 1, further comprising:
searching, by the terminal device, a home appliance, which is set to be in a state of communicating with the terminal device.

4. The network connection method of the home appliance of claim 1, wherein the home appliance and the terminal device communicate with each other using Wi-Fi (Wireless-Fidelity) direct.

5. The network connection method of the home appliance of claim 1, further comprising:
connecting the AP apparatus to the terminal device.

6. The network connection method of the home appliance of claim 1, further comprising:
accessing, by the home appliance, a server device via the AP apparatus after the home appliance is connected to the AP apparatus.

7. The network connection method of the home appliance of claim 6, further comprising:
registering, by the server device, the home appliance to a user account related to the terminal device when the home appliance accesses the server device.

8. The network connection method of the home appliance of claim 1, wherein the verifying the inputted authentication key comprises verifying, by the terminal device, the authentication key by determining whether the authentication key is identical to the authentication key of the AP apparatus stored in the terminal device.

9. The network connection method of the home appliance of claim 8, wherein the terminal device repeatedly receives the authentication key as an input to the terminal device to verify the authentication key until the authentication key is authenticated.

10. The network connection method of the home appliance of claim 1, further comprising:
transmitting, by the terminal device or the home appliance, a user authentication information to a server device so that the server device performs a user authentication based on the user authentication information.

11. The network connection method of the home appliance of claim 1, wherein the terminal device comprises at least one of a desktop computer, a laptop computer, a smart phone, a cellular phone, a tablet PC, a Smart TV, a digital cameras, a personal digital assistant (PDA), a remote controller, and a portable gaming device.

12. The network connection method of the home appliance claim 1, wherein the home appliance comprises at least one of a refrigerator, a washing machine, a television, a radio, an audio, a cleaner, an air conditioner, a home computer, an oven, a Smart TV, a digital camera, or a laptop.

13. A home appliance comprising:
a communication unit configured to:
connect to a terminal device by being set to be in a state of communicating with the terminal device, and
receive an identification number and a verified authentication key of an access point (AP) apparatus, wherein the verified authentication key of the AP apparatus is transmitted to the communication unit from the terminal device, only when the authentication key is verified by the terminal device to be identical to an authentication key of the AP apparatus stored in the terminal device; and
a processor configured to:
connect to the AP apparatus based on the identification number and the authentication key of the AP apparatus, and
control the communication unit to connect to a server device via the AP apparatus by using stored Internet Protocol (IP) address when connected to the AP apparatus.

14. A network connection system of a home appliance comprising:
an access point (AP) apparatus configured to connect to an external network;
a terminal device connected to the AP apparatus and configured to receive an input of an authentication key of the AP apparatus from a user and verify the inputted authentication key based on an authentication key of the AP apparatus stored in the terminal device; and
the home appliance configured to:
connect to the terminal device by being set to be in a state of communicating with the terminal device,
receive an identification number and the verified authentication key of the AP apparatus, and
connect to the AP apparatus based on the identification number and the authentication key,
wherein the terminal device is further configured to transmit the inputted authentication key of the AP apparatus to the home appliance, only when the inputted authentication key is verified to be identical to the authentication key of the AP apparatus stored in the terminal device.

15. The network connection system of the home appliance of claim 14, wherein the terminal device is further configured to display an operation method of setting the home appliance to be in a state of communicating with the terminal device.

16. The network connection system of the home appliance of claim 14, wherein the terminal device is further configured to search a home appliance, which is set to be in a state of communicating with the terminal device.

17. The network connection system of the home appliance of claim 14, further comprising:
a server device to which the home appliance is accessed via the AP apparatus after connected to the AP apparatus.

18. The network connection system of the home appliance of claim 17, wherein the server device is configured to register the home appliance to a user account related to the terminal device when the home appliance accesses the server device.

19. The network connection system of the home appliance of claim 17, wherein:
the terminal device or the home appliance is further configured to transmit user authentication information to the server device, and
the server device is further configured to perform a user authentication based on the user authentication information.

20. The network connection system of the home appliance of claim 14, wherein the terminal device is further configured to verify the authentication key by determining whether the authentication key is identical to the authentication key of the AP apparatus stored in the terminal device,
wherein the terminal device is further configured to repeatedly receive an authentication key as an input to the terminal device to verify the inputted authentication key until the authentication key is authenticated.

* * * * *